US011832265B2

(12) United States Patent
Oh et al.

(10) Patent No.: US 11,832,265 B2
(45) Date of Patent: Nov. 28, 2023

(54) METHOD AND APPARATUS FOR INDICATING SLOT FORMAT IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Jonghyun Bang, Gyeonggi-do (KR); Taehan Bae, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 85 days.

(21) Appl. No.: 17/106,665

(22) Filed: Nov. 30, 2020

(65) Prior Publication Data

US 2021/0168770 A1    Jun. 3, 2021

(30) Foreign Application Priority Data

Nov. 28, 2019  (KR) .................. 10-2019-0156190

(51) Int. Cl.
*H04W 72/23* (2023.01)
*H04W 72/0446* (2023.01)
(Continued)

(52) U.S. Cl.
CPC ........... *H04W 72/23* (2023.01); *H04L 5/0048* (2013.01); *H04W 16/14* (2013.01); *H04W 72/0446* (2013.01); *H04W 74/08* (2013.01)

(58) Field of Classification Search
CPC .... H04L 5/0048; H04L 5/0053; H04W 16/14; H04W 72/042; H04W 72/0446;
(Continued)

(56) References Cited

U.S. PATENT DOCUMENTS 11,516,842 B2 * 11/2022 Sun .................. H04W 74/0808
2019/0268923 A1 * 8/2019 Sundararajan .... H04W 72/1268
(Continued)

FOREIGN PATENT DOCUMENTS

CN       112788753 A  *  5/2021
WO    WO 2019/140060        7/2019
(Continued)

OTHER PUBLICATIONS

Huawei et al., "DL channels and signals in NR unlicensed band", 3GPP TSG RAN WG1 Meeting #99, Reno, USA, Nov. 18-22, 2019, R1-1911864, Total pp. 17 (Year: 2019).*
(Continued)

*Primary Examiner* — Shah M Rahman
(74) *Attorney, Agent, or Firm* — The Farrell Law Firm, P.C.

(57) ABSTRACT

A method is provided for a user equipment (UE) to obtain slot format information. The method includes receiving, from a base station (BS), configuration information about a physical downlink control channel (PDCCH); detecting downlink control information (DCI), based on the configuration information; obtaining slot format indicator (SFI) information and information about a channel occupancy time (COT) in the DCI; and determining a slot or a symbol to which the SFI information is to be applied, based on the information about the COT.

14 Claims, 15 Drawing Sheets

(51) Int. Cl.
  *H04L 5/00* (2006.01)
  *H04W 74/08* (2009.01)
  *H04W 16/14* (2009.01)

(58) Field of Classification Search
  CPC ..... H04W 74/08; H04W 72/23; H04W 76/28; H04W 74/0808
  See application file for complete search history.

(56) References Cited

U.S. PATENT DOCUMENTS

| | | | | |
|---|---|---|---|---|
| 2020/0045696 | A1* | 2/2020 | Huang | H04L 27/0006 |
| 2020/0045738 | A1* | 2/2020 | Oh | H04W 74/0808 |
| 2020/0127796 | A1* | 4/2020 | Li | H04L 5/001 |
| 2020/0154471 | A1* | 5/2020 | Sun | H04W 72/1284 |
| 2020/0154477 | A1* | 5/2020 | Sun | H04W 16/14 |
| 2020/0267764 | A1* | 8/2020 | Rastegardoost | H04W 74/02 |
| 2020/0322932 | A1* | 10/2020 | Kim | H04B 7/088 |
| 2021/0013941 | A1* | 1/2021 | Sun | H04L 5/0048 |
| 2021/0022157 | A1* | 1/2021 | Sun | H04W 74/006 |
| 2021/0051720 | A1* | 2/2021 | Thyagarajan | H04W 72/1268 |
| 2021/0105102 | A1* | 4/2021 | Li | H04L 1/1822 |
| 2021/0120431 | A1* | 4/2021 | Sun | H04W 72/14 |
| 2021/0219341 | A1* | 7/2021 | Jia | H04W 72/0446 |
| 2021/0250925 | A1* | 8/2021 | Zhang | H04W 72/042 |
| 2021/0367743 | A1* | 11/2021 | Kim | H04L 5/0078 |
| 2021/0368541 | A1* | 11/2021 | Hedayat | H04W 74/0816 |
| 2021/0410185 | A1* | 12/2021 | Do | H04W 16/14 |
| 2022/0104260 | A1* | 3/2022 | Wang | H04W 74/0866 |
| 2022/0131725 | A1* | 4/2022 | Li | H04L 27/0006 |
| 2022/0141872 | A1* | 5/2022 | Wang | H04W 72/20 370/329 |
| 2022/0210840 | A1* | 6/2022 | Kim | H04W 74/0866 |
| 2022/0295560 | A1* | 9/2022 | Shokri Razaghi | H04W 74/0816 |

FOREIGN PATENT DOCUMENTS

| | | | | |
|---|---|---|---|---|
| WO | WO 2019/217852 | | 11/2019 | |
| WO | WO-2020031819 | A1 * | 2/2020 | ........ H04W 72/0453 |
| WO | WO-2020089855 | A1 * | 5/2020 | |

OTHER PUBLICATIONS

Asustek, "Discussion on DL signals and channels ", 3GPP TSG RAN WG1 #99, Reno, USA, Nov. 18-22, 2019, R1-1913057, Total pp. 5 (Year: 2019).*
Li et al., "Channel Occupancy Time (COT) Structure in New Radio (NR) Systems Opera Ting on Unlicensed Spectrum", Apple Inc., U.S. Appl. No. 62/805,267, filed Feb. 13, 2019, Total pp. 74 (Year: 2019).*
Nokia et al., "Summary #4 of PUSCH Enhancements for NR eURLLC" (AI 7.2.6.3), R1-1913519, 3GPP TSG-RAN WG1 Meeting #99, Nov. 18-22, 2019, 50 pages.
Motorola Mobility, Lenovo, "Feature Lead Summary #3 for NR-U DL Signals and Channels", R1-1913501, 3GPP TSG RAN WG1#99, Nov. 18-22, 2019, 37 pages.
ETRI, "Remaining Issues on DL Signals and Channels for NR-U", R1-1912637, 3GPP TSG RAN WG1 #99, Nov. 18-22, 2019, 7 pages.
LG Electronics, "Physical Layer Design of DL Signals and Channels for NR-U", R1-1912387, 3GPP TSG RAN WG1 #99, Nov. 18-22, 2019, 17 pages.
International Search Report dated Mar. 5, 2021 in counterpart application No. PCT/KR2020/016847, 9 pages.
Panasonic, "DL Signals and Channels for NR-U", R1-1913098, 3GPP TSG-RAN WG1 #99, Nov. 18-22, 2019, 11 pages.
Xiaomi, "Discussion on the DL Signals and Channels for NR-U", R1-1912926, 3GPP TSG RAN WG1 #99, Nov. 18-22, 2019, 4 pages.
Samsung, "DL Signals and Channels for NR-U", R1-1910457, 3GPP TSG RAN WG1 #98bis, Oct. 14-20, 2019, 6 pages.
European Search Report dated Aug. 11, 2022 issued in counterpart application No. 20892591.7-1215, 12 pages.

* cited by examiner

METHOD AND APPARATUS FOR INDICATING SLOT FORMAT IN WIRELESS COMMUNICATION SYSTEM

CROSS-REFERENCE TO RELATED APPLICATION

This application is based on and claims priority under 35 U.S.C. § 119 to Korean Patent Application No. 10-2019-0156190, filed in the Korean Intellectual Property Office on Nov. 28, 2019, the entire disclosure of which is incorporated by herein reference.

BACKGROUND

1. Field

The disclosure relates generally to a method and apparatus for indicating a slot format in a wireless communication system.

2. Description of Related Art

To meet increasing demand with respect wireless data traffic since the commercialization of $4^{th}$ generation (4G) communication systems, efforts have been made to develop $5^{th}$ generation (5G) or pre-5G communication systems, which may also be referred to as "beyond 4G network" communication systems or "post long term evolution (post-LTE)" systems. The 5G communication system defined by the $3^{rd}$ Generation Partnership Project (3GPP) is called a new radio (NR) system.

To achieve high data rates, implementation of 5G communication systems in an ultra-high frequency millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (MIMO), full-dimension-MIMO (FD-MIMO), array antennas, analog beamforming, and large-scale antennas are being studied and applied to the NR system.

To improve system networks for 5G communication systems, various technologies such as evolved small cells, advanced small cells, cloud radio access networks (RANs), ultra-dense networks, device-to-device communication (D2D), wireless backhaul, moving networks, cooperative communication, coordinated multi-points (CoMP), and interference cancellation have been developed.

In addition, for 5G communication systems, advanced coding modulation (ACM) technologies have been developed, such as hybrid frequency-shift keying (FSK) and quadrature amplitude modulation (QAM) (FQAM) and sliding window superposition coding (SWSC), and advanced access technologies have been developed, such as filter bank multi-carrier (FBMC), non-orthogonal multiple access (NOMA), and sparse code multiple access (SCMA).

The Internet has evolved to the Internet of things (IoT), where distributed elements such as objects exchange information with each other to process the information. Internet of everything (IoE) technology has also emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology services may be provided to collect and analyze data obtained from connected objects to create new value in human life. As existing information technology (IT) and various industries converge and combine with each other, the IoT may be applied to various fields such as smart homes, smart buildings, smart cities, smart cars, connected cars, smart grids, health care, smart home appliances, and advanced medical services.

Various attempts are being made to apply 5G communication systems to an IoT network. For example, 5G communication, such as sensor networks, M2M communication, MTC, etc., are being implemented by using technologies including beamforming, MIMO, array antennas, and the like. Application of cloud RAN as the above-described big data processing technology may be an example of convergence of 5G communication technology and IoT technology.

As various services can be provided due to the aforementioned development of wireless communication systems, there is an increasing demand for improvement in a method of indicating a slot format in a wireless communication system.

SUMMARY

An aspect of the disclosure is to provide an apparatus and method for determining a channel occupancy time (COT) and/or slot format indicator (SFI) information in the COT in a wireless communication system.

According to an aspect of the disclosure, a method, performed by a user equipment (UE), is provided for obtaining slot format information. The method includes receiving, from a base station (BS), configuration information about a physical downlink control channel (PDCCH); detecting downlink control information (DCI), based on the configuration information; obtaining slot format indicator (SFI) information and information about a channel occupancy time (COT) in the DCI; and determining a slot or a symbol to which the SFI information is to be applied, based on the information about the COT.

According to another aspect of the disclosure, a method, performed by a base station (BS), is provided for providing slot format information. The method includes transmitting, to a UE, configuration information about a PDCCH; performing a channel access procedure to occupy a channel in an unlicensed band; and transmitting, to the UE, DCI including SFI information. The DCI includes COT information about a COT occupied due to the channel access procedure, and the COT information is used when a slot or a symbol to which the SFI information is to be applied is determined.

According to another aspect of the disclosure, a UE is provided for obtaining slot format information. The UE includes a transceiver; and a processor configured to receive, from a BS, configuration information about a PDCCH, detect DCI, based on the configuration information, obtain SFI information and information about a COT in the DCI, and determine a slot or a symbol to which the SFI information is to be applied, based on the information about the COT.

According to another aspect of the disclosure, a BS is provided for providing slot format information. The BS includes a transceiver; and a processor configured to transmit, to a UE, configuration information about a PDCCH, perform a channel access procedure to occupy a channel in an unlicensed band, and transmit, to the UE, DCI including SFI information. The DCI includes COT information about a COT occupied due to the channel access procedure, and the COT information is used when a slot or a symbol to which the SFI information is to be applied is determined.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
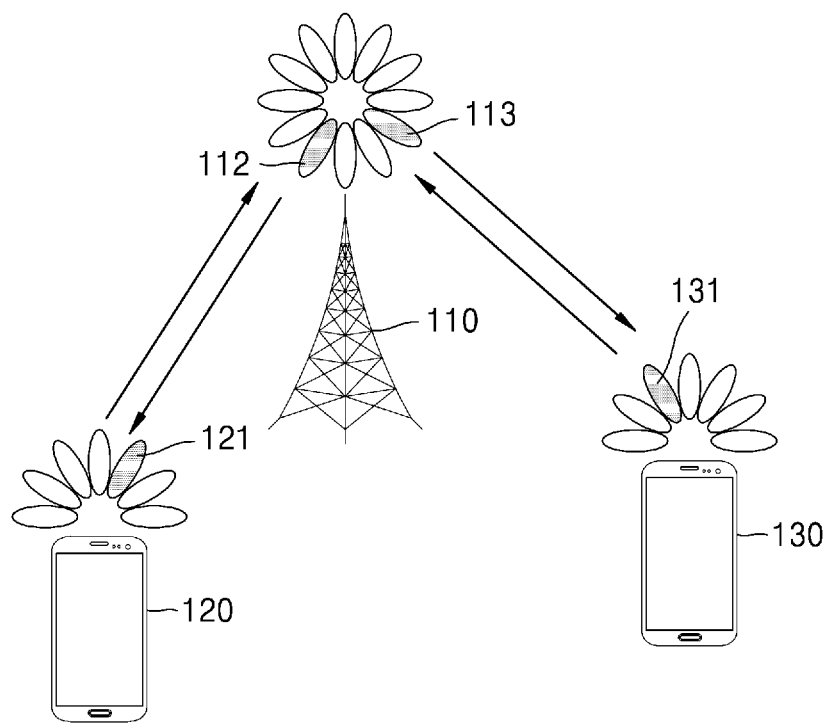
FIG. 1 illustrates a wireless communication system, according to an embodiment.

Hereinafter, various embodiments of the disclosure will be described in detail with reference to accompanying drawings. In the descriptions of the disclosure, detailed explanations of the related art are omitted when it is deemed that they may unnecessarily obscure the essence of the disclosure. The terms used in the specification are defined in consideration of functions used in the disclosure, and can be changed according to the intent or commonly used methods of users or operators. Accordingly, definitions of the terms are understood based on the entire descriptions of the present specification.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals may refer to like elements.

In the following descriptions, well-known functions or configurations in the art, which are not directly associated with the disclosure, are not described. By omitting descriptions of unnecessary details, the concept of the disclosure can be clearly described.

In the drawings, some elements may be exaggerated, omitted, or roughly illustrated. Also, size of each element does not exactly correspond to an actual size of each element.

Throughout the disclosure, expressions such "at least one of a, b or c" may indicate only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, etc.

In the disclosure, a controller may also be referred to as a processor.

A layer (or a layer apparatus) may also be referred to as an entity.

Each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory may produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "unit" may refer to a software or hardware component, such as field-programmable gate array (FPGA) or application-specific integrated circuit (ASIC), which performs certain tasks. However, the term "~ unit" is not limited to software or hardware. A "~ unit" may be configured to be in an addressable storage medium or configured to operate one or more processors. Thus, a "~ unit" may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "~ units" may be combined into fewer components and "~ units" or further separated into additional components and "~ units". Further, the components and "~ units" may be implemented to operate one or more central processing units (CPUs) in a device or a secure multimedia card. A "~ unit" may include one or more processors in embodiments of the disclosure.

Wireless communication systems have been developed from wireless communication systems providing voice centered services in the early stage toward broadband wireless communication systems providing high-speed, high-quality packet data services, like communication standards of high speed packet access (HSPA), LTE or evolved universal terrestrial radio access (E-UTRA)), and LTE-Advanced (LTE-A) of the 3GPP, high rate packet data (HRPD) and ultra mobile broadband (UMB) of 3GPP2, 802.16e of the Institute of Electrical and Electronic Engineers (IEEE), etc. As a 5G wireless communication system, 5G and/or NR wireless communication systems are being established.

In the 5G communication system, in order to provide various services and support high data rates, various technologies such as retransmission in a unit of a code block group (CBG), uplink signal transmission without uplink scheduling information (e.g., grant-free uplink transmission), etc., may be introduced. Accordingly, to perform 5G communication through an unlicensed band, there is a need for a more efficient channel access procedure, in consideration of multiple variables.

In a wireless communication system including a 5G communication system, at least one of services including enhanced mobile broadband (eMBB), massive MTC (mMTC), and ultra-reliable and low-latency communications (URLLC) may be provided to a UE. The services may be provided to the same UE during the same time period. The eMBB service may be for high-speed transmission of high-volume data, the mMTC service may be for minimization of power of the terminal and accesses by multiple terminals, and the URLLC service may be for high reliability and low latency, but the disclosure is not limited thereto. The three services may be primary services in a wireless communication system such as an LTE system or a 5G or NR system after the LTE system, but the disclosure is not limited thereto. The aforementioned services in the 5G system are exemplary, and services that are available in the 5G system are not limited to these examples.

A service providing the URLLC service may be referred to as a URLLC system, and a service providing the eMBB service may be referred to as an eMBB system. Herein, the terms "service" and "system" may be interchangeably or mixedly used.

A BS is an entity that allocates resources to a UE, and may be at least one of a next-generation node B (gNB), an evolved node B (eNode B or eNB), a Node B, a radio access unit, a BS controller, or a node on a network. Examples of a terminal may include a UE, a MS, a cellular phone, a smartphone, a computer, a multimedia system capable of performing a communication function, etc.

A downlink (DL) is a radio transmission path of a signal transmitted from a BS to a UE, and an uplink (UL) is a radio transmission path of a signal transmitted from a UE to a BS.

Although embodiments of the disclosure will be described below using an LTE system or an LTE-A system as an example, and in order to describe methods and apparatuses proposed in the disclosure, terms such as "physical channel" and "signal" in legacy LTE or LTE-A system may be used, embodiments of the disclosure may be applied to other communication systems having similar technical backgrounds or channel type. For example, the 5G mobile communication technology (5G, new radio, NR) developed after the LTE-A system may be included therein. The disclosure is also applicable to other communication systems through modification at the discretion of one of ordinary skill in the art without greatly departing from the scope of the disclosure.

As an example of a broadband wireless communication system, the 5G system or the NR system has adopted an orthogonal frequency division multiplexing (OFDM) scheme in a DL and has adopted OFDM and a single carrier frequency division multiple access (SC-FDMA) scheme or discrete Fourier transform-spread-OFDM (DFT-s-OFDM) in an UL. A multiple access scheme may distinguish between data and control information for each user by allocating and operating time-frequency resources on which the data or the control information is to be carried for each user, so that the time-frequency resources do not overlap each other, i.e., so that orthogonality is established.

The NR system has adopted a hybrid automatic repeat request (HARQ) scheme of retransmitting data at a physical layer when a decoding failure occurs in initial transmission. The HARQ scheme indicates that, when a receiver fails to correctly decode data, the receiver transmits decoding failure indication information (e.g., negative acknowledgement (NACK)) to a transmitter in order to allow the transmitter to retransmit the data at its physical layer. The receiver may combine the data, which is retransmitted by the transmitter, with data previously failed in decoding, thereby increasing data reception performance. According to the HARQ scheme, when the receiver correctly decodes the data, the transmitter transmits decoding success indication information (e.g., acknowledgement (ACK)) to the transmitter in order to allow the transmitter to transmit new data.

Hereinafter, terms indicating signals, terms indicating channels, terms indicating control information, terms indicating network entities, terms indicating elements of apparatuses, etc., as used in the following description, are exemplified for convenience of descriptions. Accordingly, the disclosure is not limited to terms to be described below, and other terms indicating objects having the same technical meanings may be used.

In the disclosure, various embodiments will be described using terms and names defined in some communication standards (e.g., the 3GPP), but the disclosure is not limited to the terms and names. Various embodiments of the disclosure may be easily modified and applied to other communication systems.

Although embodiments of the disclosure may be described based on the NR system, the disclosure is also applicable to various communication systems including LTE, LTE-A, LTE-A-Pro systems, 5G, etc. While the disclosure relates to a system and apparatus for transmitting and receiving signals by using an unlicensed band, embodiments of the disclosure may also be applicable to a system that operates in a licensed band.

Higher layer signaling or an upper signal may refer to a method of transferring a signal transferred to a UE from a BS using a DL data channel of a physical layer or a signal transferred to the BS from the UE using an UL data channel of a physical layer, and may include at least one of radio resource control (RRC) signaling, packet data convergence protocol (PDCP) signaling, or a signal transfer scheme using a media access control (MAC) control element (CE). The higher layer signaling or the upper signal may also include a system information block (SIB) that is system information to be commonly transmitted to a plurality of UEs, and may also include information other than a master information block (MIB) from among a plurality of pieces of information transmitted through a physical broadcast channel (PBCH). The MIB may also be included in the upper signal.

A method and apparatus for indicating a slot format in a wireless communication system will be described below. For example, the disclosure relates to an unlicensed band channel occupancy time and/or a method of transmitting or receiving slot format indicator information in the unlicensed band channel occupancy time, at a node that performs UL/DL communication by using a wireless communication system, more particularly, an unlicensed band.

An apparatus and method of the disclosure may provide a channel access procedure performed by a UE to transmit a UL signal or channel through an unlicensed band, and a method of correctly determining a time resource domain of UL/DL signal or channel, such that a BS and a UE can further effectively perform communication.

FIG. 1 illustrates a wireless communication system, according to an embodiment.

Referring to FIG. 1, the wireless communication system includes a BS 110, a terminal 120, and a terminal 130 using wireless channels in the wireless communication system. While FIG. 1 illustrates only one BS 110, additional BSs may also be present.

The BS 110 provides wireless access to the terminals 120 and 130. The BS 110 may have a coverage area defined as a preset geographical region based on a range for transmitting a signal. The BS 110 may also be referred to as an access point (AP), an eNB, a gNB, a 5G node, a wireless point, a transmission/reception point (TRP), or other term having same technical meaning.

The terminals 120 and 130 may be used by users and may perform communication with the BS 110 through the wireless channels. At least one of the terminals 120 and 130 may be operated without user-involvement. That is, at least one of the terminal 120 and the terminal 130 may be a device performing MTC and may not be carried by a user. Each of the terminals 120 and 130 may be referred to as a UE, an MS, a subscriber station, a remote terminal, a wireless terminal, a user device, or other term having same technical meaning.

A wireless communication environment may include wireless communication in an unlicensed band. The BS 110, the terminal 120, and the terminal 130 may transmit and receive wireless signals in the unlicensed band (e.g., 5 to 7 GHz and/or 64 to 71 GHz). In the unlicensed band, a cellular communication system and another communication system (e.g., a wireless local area network (WLAN)) may coexist. To ensure fairness between two communication systems, e.g., to prevent a situation in which a channel is exclusively used by one system, the BS 110, the terminal 120, and the terminal 130 may perform a channel access procedure for the unlicensed band. The channel access procedure for an unlicensed band may include a listen before talk (LBT) procedure.

The BS 110, the terminal 120, and the terminal 130 may transmit and receive a wireless signal in a millimeter-wave (mmWave) band (e.g., 28 gigahertz (GHz), 30 GHz, 38 GHz, and/or 60 GHz band). To increase channel gain, the BS 110, the terminal 120, and the terminal 130 may perform beamforming, which may include transmission beamforming and reception beamforming. That is, the BS 110, the terminal 120, and the terminal 130 may apply directivity to a transmission signal or a reception signal. The BS 110 and the terminals 120 and 130 may select serving beams via a beam search procedure a beam management procedure. After the serving beams are selected, communication may be performed using a resource in a quasi-co-located (QCL) relation with a resource that transmitted the serving beams.

Figure 2:
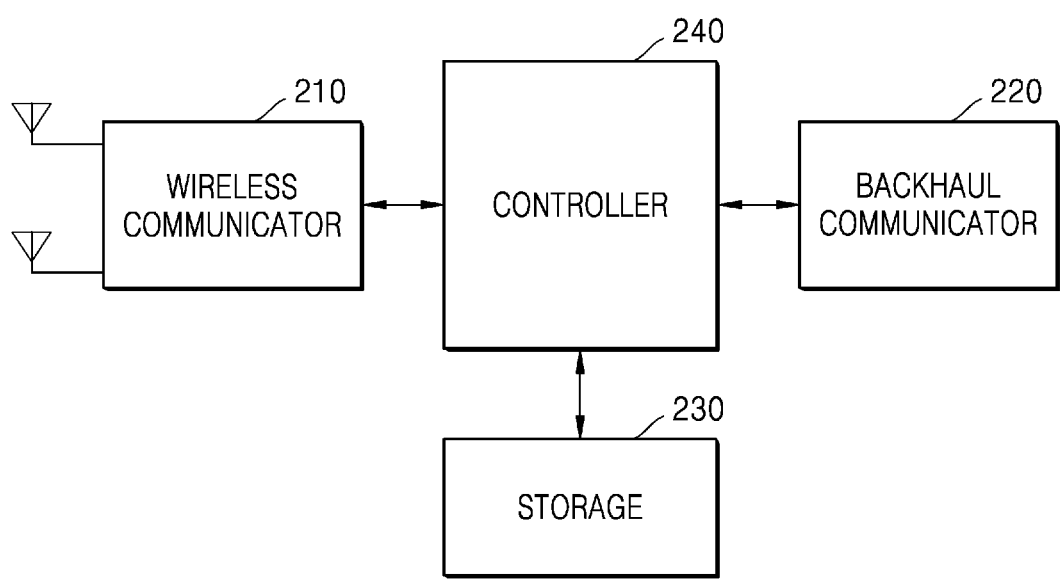
FIG. 2 illustrates a BS for use in a wireless communication system, according to an embodiment.

FIG. 2 illustrates a BS for use in a wireless communication system, according to an embodiment.

Referring to FIG. 2, the BS includes a wireless communicator 210, a backhaul communicator 220, a storage 230, and a controller 240. However, elements of the BS are not limited to the aforementioned example. For example, the BS may include more elements than the aforementioned elements or may include fewer elements than the aforementioned elements. Further, the wireless communicator 210, the backhaul communicator 220, the storage 230, and the controller 240 may be implemented as one chip. The controller 240 may refer to one or more controllers, and each configuration may include at least one processor.

The wireless communicator 210 performs functions for transmitting or receiving a signal through a wireless channel. For example, the wireless communicator 210 performs conversion between a baseband signal and a bit string based on physical layer specifications of a system. For data transmission, the wireless communicator 210 may generate complex symbols by encoding and modulating a transmission bit string. For data reception, the wireless communicator 210 may reconstruct a reception bit string by demodulating and decoding a baseband signal.

The wireless communicator 210 up-converts a baseband signal into a radio frequency (RF) band signal and then transmits the RF band signal through an antenna, and down-converts an RF band signal received through the antenna, into a baseband signal. The wireless communicator 210 may include a transmission filter, a reception filter, an amplifier, a mixer, an oscillator, a digital-to-analog convertor (DAC), an analog-to-digital convertor (ADC), etc. The wireless communicator 210 may include a plurality of transmission and reception paths. Further, the wireless communicator 210 may include at least one antenna array including a plurality of antenna elements.

In terms of hardware, the wireless communicator 210 may be configured as a digital unit and an analog unit, and the analog unit may be configured as a plurality of sub-units depending on operating power, an operating frequency, etc. The digital unit may be configured as a digital signal processor (DSP).

The wireless communicator 210 may transmit and receive signals as described above. Accordingly, all parts or some parts of the wireless communicator 210 may be referred to as a transmitter, a receiver, or a transceiver. Transmission and reception performed through a wireless channel indicate that the aforementioned processing performed by the wireless communicator 210 is applied thereto. The wireless communicator 210 may include at least one transceiver.

The backhaul communicator 220 provides an interface for performing communication with other nodes in a network. That is, the backhaul communicator 220 converts a bit string to a physical signal, the bit string being transmitted from the BS to another node, e.g., another access node, another BS, an upper node, a core network, etc., and converts a physical signal to a bit string, the physical signal being received from another node.

The storage 230 stores basic programs, application programs, and data, e.g., configuration information, for operations of the BS. The storage 230 may be configured as a volatile memory, a non-volatile memory, or a combination of a volatile memory and a non-volatile memory. Further, the storage 230 provides stored data, in response to a request by the controller 240. The storage 230 may include a memory, such as a read-only memory (ROM), a random access memory (RAM), a hard disc, a compact disc-ROM (CD-ROM), a digital versatile disc (DVD), etc., or a combination of storage media.

The controller 240 controls overall operations of the BS. For example, the controller 240 transmits and receives signals via the wireless communicator 210 or the backhaul communicator 220. The controller 240 may record data to or read data from the storage 230. The controller 240 may perform functions of a protocol stack which are requested by the communication rules. The protocol stack may be included in the wireless communicator 210. The controller 240 may include at least one processor.

The controller 240 may control the BS to perform operations according to various embodiments to be described below. The controller 240 may perform a channel access procedure on an unlicensed band. The transceiver (e.g., the wireless communicator 210) may receive signals transmitted through the unlicensed band, and the controller 240 may determine whether the unlicensed band is in an idle state, by comparing strength of the received signal with a threshold value that is predefined or is determined as a value according to a function where a bandwidth is a factor.

The controller 240 may transmit a control signal to a UE or receive a control signal from the UE, via the transceiver. The controller 240 may transmit data to the UE or receive data from the UE, via the transceiver. Based on the control signal or data signal received from the UE, the controller 240 may determine a transmission result with respect to a signal transmitted to the UE.

Based on the transmission result, i.e., a reception result with respect to the control signal or data signal received by the UE, the controller 240 may maintain or change a value of a contention window (hereinafter, referred to as the contention window adjustment) for the channel access procedure. The controller 240 may determine a reference slot to obtain the transmission result for the contention window adjustment. The controller 240 may determine, at the reference slot, a data channel for the contention window adjustment. The controller 240 may determine, at the reference slot, a reference control channel for the contention window adjustment. When it is determined that the unlicensed band is in the idle state, the controller 240 may occupy a channel.

Figure 3:
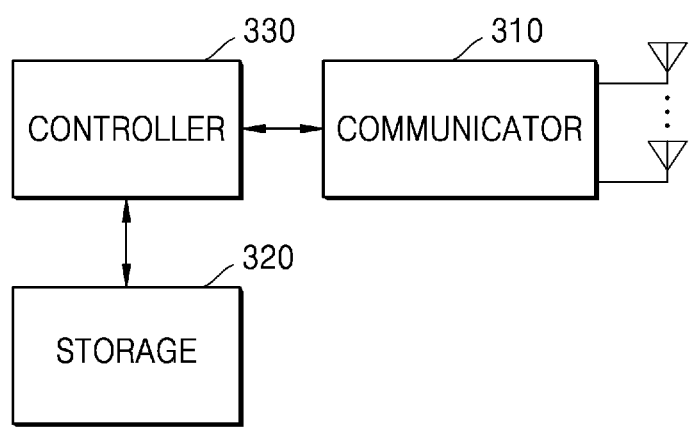
FIG. 3 illustrates a UE for use in a wireless communication system, according to an embodiment.

FIG. 3 illustrates a UE for use in a wireless communication system, according to an embodiment.

Referring to FIG. 3, the UE includes a communicator 310, a storage 320, and a controller 330. However, elements of the UE are not limited to the aforementioned example. For example, the UE may include more elements than the aforementioned elements or may include fewer elements than the aforementioned elements. Further, the communicator 310, the storage 320, and the controller 330 may be implemented as one chip. The controller 330 may refer to one or more controllers, and each configuration may include at least one processor.

The communicator 310 may perform functions for transmitting and receiving signals through a wireless channel. For example, the communicator 310 performs conversion between a baseband signal and a bit string based on physical layer specifications of a system. For data transmission, the communicator 310 may generate complex symbols by encoding and modulating a transmission bit string. For data reception, the communicator 310 may reconstruct a reception bit string by demodulating and decoding a baseband signal. The communicator 310 up-converts a baseband signal into an RF band signal and then transmits the RF band signal through an antenna, and down-converts an RF band signal received through the antenna, into a baseband signal. The communicator 310 may include a transmission filter, a reception filter, an amplifier, a mixer, an oscillator, a DAC, an ADC, etc.

The communicator 310 may include a plurality of transmission and reception paths. The communicator 310 may include at least one antenna array including a plurality of antenna elements. In terms of hardware, the communicator 310 may be configured as a digital circuit and an analog circuit (e.g., an RF integrated circuit (RFIC)). In this regard, the digital circuit and the analog circuit may be implemented as one package. The communicator 310 may include a plurality of RF chains. The communicator 310 may perform beamforming.

The communicator 310 may transmit and receive signals as described above. Accordingly, all parts or some parts of the communicator 310 may be referred to as a transmitter, a receiver, or a transceiver. In the descriptions below, transmission and reception performed through a wireless channel indicate that the aforementioned processing performed by the communicator 310 is applied thereto. The communicator 310 may include at least one transceiver.

The storage 320 stores basic programs, application programs, and data, e.g., configuration information, for operations of the UE. The storage 320 may be configured as a volatile memory, a non-volatile memory, or a combination of a volatile memory and a non-volatile memory. The storage 320 provides stored data, in response to a request by the controller 330. The storage 320 may include a memory such as a ROM, a RAM, a hard disc, a CD-ROM, a DVD, etc., or a combination of storage media.

The controller 330 controls overall operations of the UE. For example, the controller 330 transmits and receives signals via the communicator 310. The controller 330 records data to or reads data from the storage 320. The controller 330 may perform functions of a protocol stack which are requested by the communication rules. The controller 330 may include at least one processor or microprocessor or may be a part of a processor. The controller 330 may include at least one processor. A part of the communicator 310 and/or the controller 330 may be referred to as a communication processor.

The controller 330 may control the UE to perform operations according to various embodiments to be described below. For example, the controller 330 may receive, via the transceiver (e.g., the communicator 310), a DL signal (a DL control signal or DL data) transmitted from a BS. The controller 330 may determine a transmission result with respect to the DL signal. The transmission result may include information of a feedback with respect to ACK, NACK, discontinuous transmission (DTX), etc., of the transmit DL signal. The transmission result may be referred to as various terms including a reception state of a DL signal, a reception result of the DL signal, a decoding result of the DL signal, HARQ-ACK information of the DL signal, etc. The controller 330 may transmit, to the BS, a UL signal as a response signal to the DL signal via the transceiver. The UL signal may explicitly or implicitly include the transmission result of the DL signal.

The controller 330 may perform a channel access procedure on an unlicensed band. For example, the transceiver (e.g., the communicator 310) may receive signals transmitted through the unlicensed band, and the controller 330 may determine whether the unlicensed band is in an idle state, by comparing strength of the received signal with a threshold value that is predefined or is determined as a value according to a function where a bandwidth is a factor. The controller 330 may perform an access procedure on the unlicensed band in order to transmit a signal to the BS.

Figure 4:
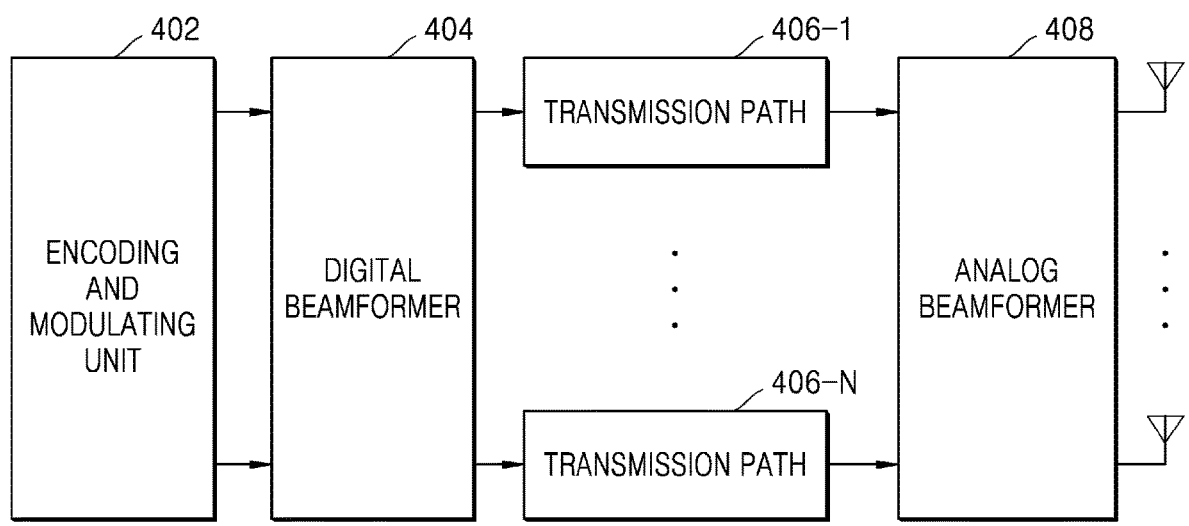
FIG. 4 illustrates a communicator in a wireless communication system, according to an embodiment.

FIG. 4 illustrates a communicator in a wireless communication system, according to an embodiment.

Referring to FIG. 4, the communicator includes an encoding and modulating unit 402, a digital beamformer 404, a plurality of transmission paths 406-1 to 406-N, and an analog beamformer 408.

The encoding and modulating unit 402 performs channel encoding. For the channel encoding, at least one of low density parity check (LDPC) codes, convolution codes, or polar codes may be used. The encoding and modulating unit 402 generates modulated symbols by performing constellation mapping.

The digital beamformer 404 performs beamforming on a digital signal (e.g., the modulated symbols). For example, the digital beamformer 404 multiplies the modulated symbols by beamforming weights. The beamforming weights are used to change the magnitude and phase of a signal and may be referred to as a precoding matrix, a precoder, etc. The digital beamformer 404 outputs modulated symbols that are digitally-beamformed by the plurality of transmission paths 406-1 to 406-N. According to a MIMO transmission technique, the modulated symbols may be multiplexed or same modulated symbols may be provided to the plurality of transmission paths 406-1 to 406-N.

The plurality of transmission paths 406-1 to 406-N may convert digitally-beamformed digital signals to analog signals. Each of the plurality of transmission paths 406-1 to 406-N may include an inverse fast Fourier transform (IFFT) operator, a cyclic prefix (CP) inserter, a DAC, and an up-converter. The CP inserter is arranged for an OFDM scheme, and may be excluded when a different physical layer scheme (e.g., FBMC) is applied. That is, the plurality of transmission paths 406-1 to 406-N provide independent signal processing processes to a plurality of streams generated through digital beamforming. However, depending on implementation methods, some elements of the plurality of transmission paths 406-1 to 406-N may be commonly used.

The analog beamformer 408 performs beamforming on an analog signal. The analog beamformer 408 multiplies the analog signals by beamforming weights. The beamforming weights are used to change the magnitude and phase of a signal. The analog beamformer 408 may be variously configured, based on connection structures between the plurality of transmission paths 406-1 to 406-N and antennas. Each of the plurality of transmission paths 406-1 to 406-N may be connected to one antenna array or the plurality of transmission paths 406-1 to 406-N may be connected to one antenna array. The plurality of transmission paths 406-1 to 406-N may also be adaptively connected to one antenna array or at least two antenna arrays.

In a 5G system, a frame structure should be flexibly defined in consideration of various services and requirements. For example, the services may have different subcarrier spacings, respectively, according to requirements. The current 5G communication system supports a plurality of subcarrier spacings, and each of the subcarrier spacings may be determined by using Equation (1).

$$\Delta f = f_0 * 2^m \qquad (1)$$

In Equation (1), $f_0$ denotes a default subcarrier spacing of a system, m denotes a scaling factor of an integer, and $\Delta f$ denotes a subcarrier spacing. When $f_0$=15 kHz, a set of subcarrier spacings allowed for the 5G communication system may be configured of one of 3.75 kHz, 7.5 kHz, 15 kHz, 30 kHz, 60 kHz, 120 kHz, 240 kHz, and 480 kHz. A set of allowed subcarrier spacings may vary according to frequency bands. For example, at least one of subcarrier spacings of 3.75 kHz, 7.5 kHz, 15 kHz, 30 kHz, and 60 kHz may be used in a frequency band less than or equal to 7 GHz, and at least one of subcarrier spacings of 60 kHz, 120 kHz, 240 kHz or more may be used in a frequency band greater than or equal to 7 GHz.

A length of an OFDM symbol may be changed according to subcarrier spacings constituting the OFDM symbol because characteristics of the OFDM symbol, the subcarrier spacings, and the length of the OFDM symbol have a reciprocal relation to each other. For example, when a subcarrier spacing is doubled, a symbol length is reduced in half, and when the subcarrier spacing is reduced in half, the symbol length is doubled.

Figure 5:
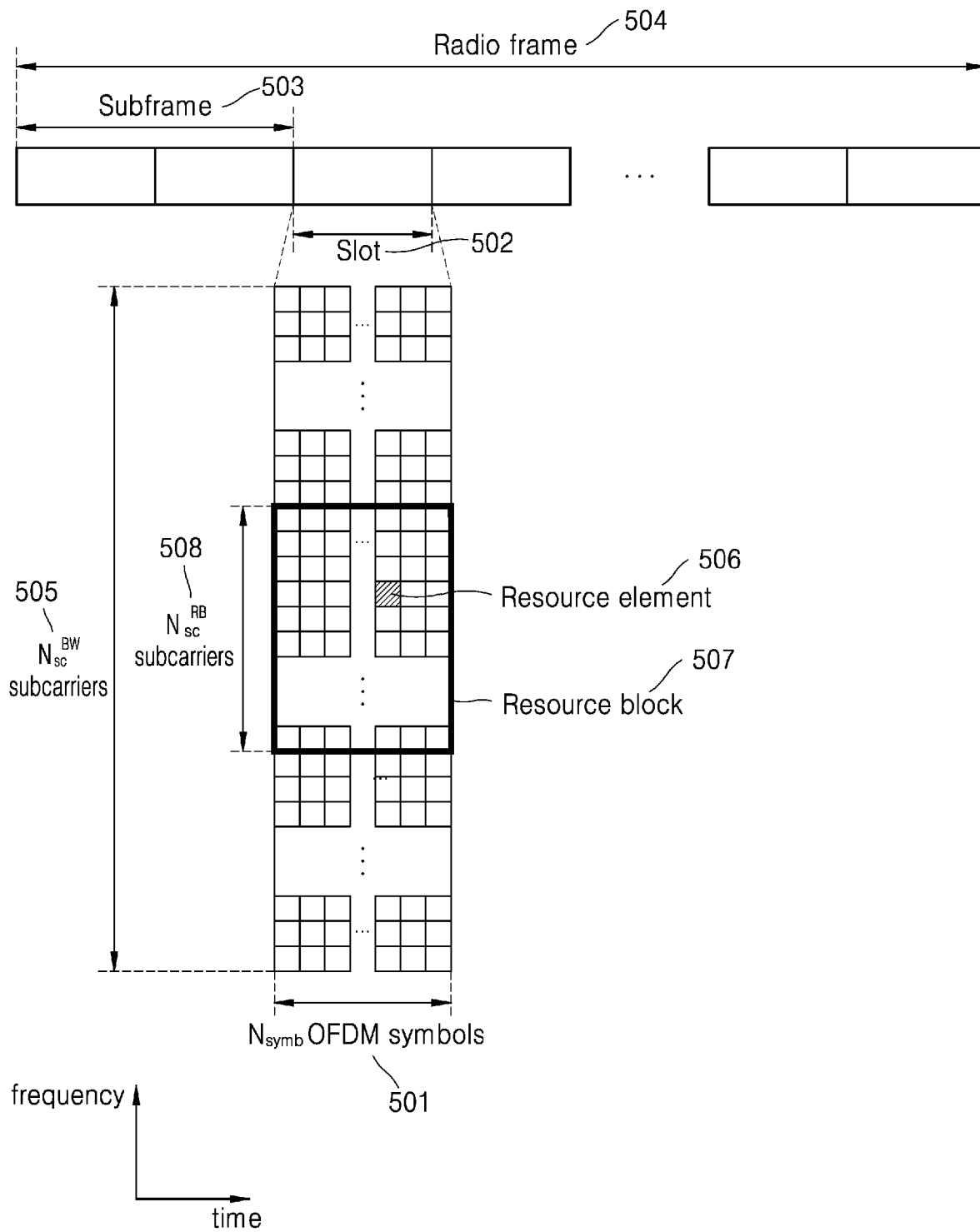
FIG. 5 illustrates a radio resource domain in a wireless communication system, according to an embodiment.

FIG. 5 illustrates a radio resource domain in a wireless communication system, according to an embodiment.

Referring to FIG. 5, in the radio resource domain, which is a time-frequency domain structure, a horizontal axis thereof represents a time domain and a vertical axis thereof represents a frequency domain. A minimum transmission unit in the time domain may be an OFDM and/or DFT-s-OFDM symbol, and $N_{symb}$ OFDM and/or DFT-s-OFDM symbols 501 may constitute a slot 502. The OFDM symbol may include a symbol for transmitting or receiving a signal by using an OFDM multiplexing scheme, and the DFT-s-OFDM symbol may include a symbol for transmitting or receiving a signal by using a SC-FDMA multiplexing scheme.

Although an embodiment of the disclosure will be described with reference to an OFDM symbol, the embodiment is also applicable to a DFT-s-OFDM symbol. Further, while DL signal transmission or reception will be described, the embodiment is also applicable to UL signal transmission or reception.

When the subcarrier spacing is 15 kHz, unlike what is illustrated in FIG. 5, the one slot 502 may constitute a subframe 503, and lengths of the slot 502 and the subframe 503 may each be 1 ms. The number of slots constituting the one subframe 503 and the length of the slot 502 may be different depending on the subcarrier spacing. For example, when the subcarrier spacing is 30 kHz, two slots may constitute the one subframe 503, the length of each of the two slots may be 0.5 ms, and the length of the subframe 503 may be 1 ms. A radio frame 504 may be a time domain interval consisting of 10 subframes. A minimum transmission unit in the frequency domain is a subcarrier, and carrier bandwidths that constitute a resource grid may consist of a total of $N_{sc}^{BW}$ subcarriers 505.

However, the subcarrier spacing, the number of slots 502 included in the subframe 503, the length of the slot 502, and the length of the subframe 503 may be variably applied. For example, in the LTE system, the subcarrier spacing is 15 kHz and two slots constitute the one subframe 503, in which case the length of the slot 502 may be 0.5 ms and the length of the subframe 503 may be 1 ms. In the NR system, a subcarrier spacing (μ) may be one of 15 kHz, 30 kHz, 60 kHz, 120 kHz, and 240 kHz, and the number of slots included in one subframe may be 1, 2, 4, 8, or 16 according to the subcarrier spacing (μ).

In the time-frequency domain, a default resource unit may be a resource element (RE) 506, and the RE 506 may be represented with an OFDM symbol index and a subcarrier index. A resource block (RB) may include a plurality of REs. In the LTE system, an RB (or a physical RB (PRB)) may be defined by $N_{sym}$ consecutive OFDM symbols in the time domain and $N_{SC}^{RB}$ consecutive subcarriers in the frequency domain. The number of symbols included in one RB may be $N_{symb}=14$, and the number of subcarriers may be $N_{SC}^{RB}=12$, or the number of symbols included in one RB may be $N_{symb}=7$ and the number of subcarriers may be $N_{SC}^{RB}=12$. The number of RBs ($N_{RB}$) may vary according to a bandwidth of a system transmission band.

In the NR system, an RB 507 may be defined by $N_{SC}^{RB}$ consecutive subcarriers in the frequency domain. The number of subcarriers may be $N_{SC}^{RB}=12$. The frequency domain may include common RBs (CRBs), and a PRB may be defined in a bandwidth part (BWP) in the frequency domain. Different CRB and PRB numbers may be determined according to the subcarrier spacing.

DL control information may be transmitted in first N OFDM symbol(s) in a slot. In general, N may be N={1, 2, 3}, and a UE may be configured with the number of symbols in which DL control information may be transmitted from a BS through higher layer signaling. Based on the amount of control information to be transmitted in a current slot, the BS may change the number of symbols in which the DL control information may be transmitted for each slot, and may transmit information about the number of symbols to the UE through a separate DL control channel.

In the NR and/or LTE system, scheduling information for DL data or UL data may be transmitted via DCI from the BS to the UE. The DCI may be defined in various formats, each format being changed according to whether the DCI includes scheduling information for UL data (UL grant) or scheduling information for DL data (DL grant), whether the DCI corresponds to compact DCI with a small size of control information or fall-back DCI, whether spatial multiplexing with multiple antennas is applied, and/or whether the DCI corresponds to DCI for power control.

A DCI format (e.g., DCI format 1_0 of NR) corresponding to scheduling control information (DL grant) for DL data may include at least one of the following pieces of control information. NR DCI format 1_0 may include scheduling for DL data.

DCI format identifier: an identifier for identifying a format of the DCI
frequency domain resource allocation: indicates an RB allocated for data transmission
time domain resource allocation: indicates slots and symbols allocated for data transmission
virtual RB (VRB)-to-PRB mapping: indicates whether to apply a VRB mapping scheme
Modulation and coding scheme (MCS): indicates a size of a transport block (TB) that is data to be transmitted and modulation scheme used for data transmission
New data indicator (NDI): indicates whether it is HARQ initial transmission or retransmission
Redundancy version (RV): indicates an RV of HARQ
HARQ process number indicates a process number of HARQ
Physical DL shared channel (PDSCH) assignment index (or DL assignment index): indicates the number of PDSCH reception results to be reported from the UE to the BS (e.g., the number of HARQ-ACKs)
Transmit Power Control (TPC) command for Physical UL Control Channel (PUCCH): indicates a TPC command for a PUCCH
PUCCH resource indicator: indicates a PUCCH resource used in reporting HARQ-ACK that includes a reception result of a PDSCH configured via the DCI
PUCCH transmit timing indicator (or PDSCH-to-HARQ_feedback timing indicator): indicates information about a slot or a symbol in which a PUCCH for reporting HARQ-ACK including a reception result of a PDSCH configured via the DCI is to be transmitted.

The DCI may be transmitted on a PDCCH (or control information) or an enhanced PDCCH (EPDCCH) (or enhanced control information) after channel coding and modulation processes. Transmission or reception on a PDCCH or EPDCCH may be understood as DCI transmission or reception on the PDCCH or EPDCCH, and transmission or reception on a PDSCH may be understood as DL data transmission or reception on the PDSCH.

A cyclic redundancy check (CRC) scrambled by a particular radio network temporary identifier (RNTI) or a cell RNTI (C-RNTI) that is independent for each UE, may be added to the DCI, and the DCI for each UE may be channel coded and then may be configured into an independent PDCCH and transmitted. In the time domain, the PDCCH may be transmitted during a control channel transmission interval. In the frequency domain, a mapping position of the PDCCH may be determined by at least an identifier (ID) of each UE, and may be transmitted in the entire system transmission band or a frequency band configured in the system transmission band. Alternatively, in the frequency domain, a mapping position of the PDCCH may be configured by higher layer signaling.

DL data may be transmitted on a PDSCH that is a physical channel for DL data transmission. The PDSCH may be transmitted after a control channel transmission interval, and in the frequency domain, scheduling information such as a mapping position of the PDSCH and a modulation scheme for the PDSCH may be determined based on DCI transmitted through a PDCCH.

Based on MCS information among the control information configuring the DCI, the BS may notify the UE of a modulation scheme applied to the PDSCH to be transmitted and the size of data to be transmitted (e.g., transport block size (TBS)). An MCS may be configured of 5 bits or may be greater than or less than 5 bits. The TBS corresponds to the size of a TB before channel coding for error correction is applied to the data (or TB) to be transmitted by the BS. However, the disclosure is not limited to the above example and the sizes of the MCS and the TBS may vary according to configurations.

In the NR system, a modulation scheme supported for UL and DL data transmission may include at least one of quadrature phase shift keying (QPSK), 16 quadrature amplitude modulation (16QAM), 64QAM, or 256QAM, and each modulation order $Q_m$ may be 2, 4, 6, or 8. For example, 2 bits per symbol may be transmitted for QPSK modulation, 4 bits per symbol may be transmitted for 16QAM modulation, 6 bits per symbol may be transmitted for 64QAM modulation, and 8 bits per symbol may be transmitted for 256QAM modulation. A modulation scheme above 256QAM may be used according to a system modification.

For a system that performs communication in an unlicensed band, a communication apparatus (a BS or a UE) that attempts to transmit a signal in the unlicensed band may perform, before transmission of the signal, a channel access procedure or LBT on the unlicensed band in which the communication apparatus performs communication, and may access the unlicensed band and perform signal transmission when it is determined that the unlicensed band is in an idle state according to the channel access procedure.

When it is determined that the unlicensed band is not in the idle state according to the channel access procedure performed, the communication apparatus may not perform signal transmission.

The channel access procedure in the unlicensed band may be classified by whether a time to start the channel access procedure of the communication apparatus is fixed (frame-based equipment (FBE)) or variable (load-based equipment (LBE)). In addition to the time to start the channel access procedure, the communication apparatus may be determined to be the FBE or the LBE according to whether a transmit/receive structure of the communication apparatus has a cycle or does not have a cycle. In this case, the time to start the channel access procedure being fixed means that the channel access procedure of the communication apparatus may start periodically according to a predefined cycle or a cycle declared or configured by the communication apparatus.

As another example, the time to start the channel access procedure being fixed may indicate that the transmit/receive structure of the communication apparatus has a cycle. In this regard, the time to start the channel access procedure being variable indicates that the communication apparatus may transmit a signal in an unlicensed band at any time. As another example, the time to start the channel access procedure being variable may indicate that the transmit/receive structure of the communication apparatus may be determined when required without having a cycle.

Hereinafter, a channel access procedure in a case that the time to start the channel access procedure of the communication apparatus is variable, i.e., LBE, (hereinafter, referred to as the traffic based channel access procedure or the LBE based channel access procedure) will now be described.

The channel access procedure in an unlicensed band may include a procedure of measuring strength of a signal received by the communication apparatus in the unlicensed band for a fixed period of time or a period of time calculated according to a predefined rule (e.g., a time calculated with at least a random value selected by the BS or the UE), and determining an idle state of the unlicensed band by comparing the measured strength of the signal with a predefined threshold or a threshold calculated by a function that determines the magnitude of the strength of the received signal according to at least one variable among a channel bandwidth, a bandwidth in which a signal is to be transmitted, and/or strength of transmission power.

A communication apparatus may measure the strength of the received signal for a time Xus (e.g., 25 us) immediately before a point in time to transmit a signal, may determine that the unlicensed band is in the idle state and may transmit a configured signal when the strength of the measured signal is smaller than a threshold T (e.g., −72 dBm) predefined or calculated in advance. In this case, after the channel access procedure, a maximum period of time available for continuous signal transmission may be restricted by a maximum COT (MCOT) defined for each country, region, or frequency band based on each unlicensed band, and even by a type of the communication apparatus (e.g., a BS or a UE, or a master device or a slave device). For example, in the 5 GHz unlicensed band for Japan, a BS or a UE may occupy a channel to transmit a signal without performing an additional channel access procedure for up to 4 ms for an unlicensed band determined to be in an idle state.

When the BS or the UE attempts to transmit a DL or UL signal in the unlicensed band, a channel access procedure that may be performed by the BS or the UE may be identified as at least one of following types:

Type 1: transmitting a ULDL signal after performing a channel access procedure for a variable period of time Type 2: transmitting a ULDL signal after performing a channel access procedure for a fixed period of time Type 3: transmitting a DL or UL signal without performing a channel access procedure A transmitting apparatus (e.g., a BS or a UE) which attempts to perform signal transmission in an unlicensed band may determine a scheme (or a type) of the channel access procedure according to a type of a signal to be transmitted. In the 3GPP, an LBT procedure that is a channel access scheme may be broadly classified into four categories, which include a first category including a scheme that does not perform LBT, a second category including a scheme that performs LBT without random backoff, a third category including a scheme that performs LBT through random backoff in a contention window with a fixed size, and a fourth category including a scheme that performs LBT through random backoff in a contention window with a variable size The third and fourth categories may be reserved for Type 1, the second category may be reserved for Type 2, and the first category may be reserved for Type 3. In this case, Type 2 or the second category that performs a channel access procedure for a fixed period of time may be classified into one or more types according to the fixed period of time for which the channel access procedure is performed. For example, Type 2 may be classified into a type for performing the channel access procedure for a fixed period of time A μs (e.g., 25 ρs) and a type for performing the channel access procedure for a fixed period of time B μs (e.g., 16 ρs).

A transmitting apparatus may be assumed to be a BS, and as such, the terminologies transmitting apparatus and the BS may be interchangeably used.

When a BS attempts to transmit a DL signal including a DL data channel in an unlicensed band, the BS may perform a channel access procedure in a scheme of Type 1. Otherwise, when a BS attempts to transmit a DL signal that does not include a DL data channel in an unlicensed band, e.g., when the BS attempts to transmit a synchronization signal or a DL control channel, the BS may perform a channel access procedure in a scheme of Type 2 and may transmit a DL signal.

In this case, a scheme of the channel access procedure may be determined according to a transmission length of a signal to be transmitted in the unlicensed band or a length of a period of time or an interval that occupies and uses the unlicensed band. The channel access procedure in a scheme of Type 1 may be performed for a longer period of time than in a scheme of Type 2. Accordingly, when the communication apparatus attempts to transmit a signal for a short period of time or a period of time less than or equal to a reference time (e.g., X ms or Y symbols), the channel access procedure may be performed in a scheme of Type 2. On the other hand, when the communication apparatus attempts to transmit a signal for a long period of time or a period of time greater than or equal to the reference time (e.g., X ms or Y symbols), the channel access procedure may be performed in a scheme of Type 1. That is, the channel access procedure may be performed in one of different schemes according to a use time of the unlicensed band.

When the transmitting apparatus performs a channel access procedure in a scheme of Type 1 according to at least one of the aforementioned references, the transmitting apparatus that attempts to transmit a signal in the unlicensed band may determine a channel access priority class according to quality of a service class identifier (e.g., QCI) of the signal to be transmitted in the unlicensed band, and may perform the channel access procedure by using at least one of predefined setting values as shown in Table 1 below for the determined channel access priority class.

Table 1 represents mapping relations between the channel access priority class and the QCI. The mapping relations between the channel access priority class and the QCI as in Table 1 are merely an example and thus are not limited thereto.

For example, QCs 1, 2, and 4 refer to QCI values for services such as Conversational Voice, Conversational Video (Live Streaming), and Non-Conversational Video (Buffered Streaming). When a signal for a service that does not match a QCI in Table 1 is to be transmitted in an unlicensed band, the transmitting apparatus may select a QCI closest to the service from among QCIs in Table 1 and may select a corresponding channel access priority class.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

Parameter values for a channel access priority class (e.g., defer duration according to the determined channel access priority p, a set (CW_p) of contention window values or sizes, minimum and maximum values (CW_min,p and CW_max,p) of a contention window, and an available maximum channel occupancy interval (T_mcot,p)) may be determined as shown in Table 2 below.

Table 2 represents parameter values for channel access priority types for DL.

Figure 6:
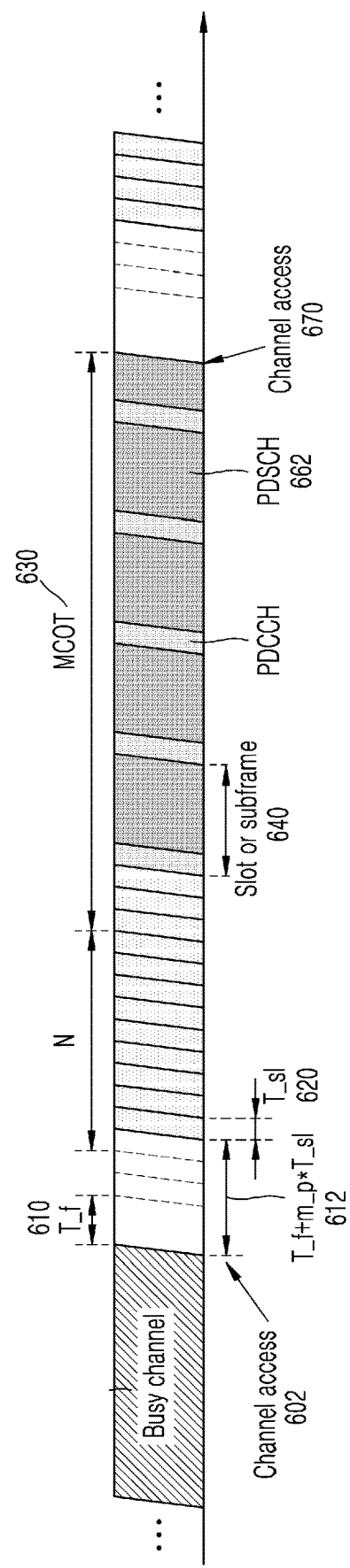
FIG. 6 illustrates a channel access procedure in an unlicensed band in a wireless communication system, according to an embodiment.

FIG. 6 illustrates a channel access procedure in an unlicensed band in a wireless communication system, according to an embodiment.

Referring to FIG. 6, a BS attempting to transmit a DL signal in the unlicensed band may perform a channel access procedure on the unlicensed band for a minimum period of time T_f+m_p*T_sl (e.g., defer duration 612). When the BS attempts to perform a channel access procedure with a channel access priority class 3 (p=3), the size of T_f+m_p*T_sl, which is a size of T_f+m_p*T_sl of the defer duration required to perform the channel access procedure, may be configured by using m_p=3. In this case, T_f has a value fixed to 16 μs (e.g., duration 610), during which first T_sl time needs to be in an idle state, and for the remaining time (T_f−T_sl) after T_sl among T_f time, the BS may not perform the channel access procedure. Even when the BS performs the channel access procedure for the remaining time (T_f−T_sl), the result of the channel access procedure may not be used. That is, T_f−T_sl refer to a period of time for which the BS defers performing the channel access procedure.

When it is determined that the unlicensed band is in the idle state for the whole time m_p*T_sl, N may be N−1 (N=N−1). In this case, N may be selected to be an arbitrary integer value from among values between 0 and a value (CW_p) in a contention window at a time to perform the channel access procedure. For the channel access priority class 3, a minimum contention window value and a maximum contention window value are 15 and 63, respectively. When an unlicensed band is determined to be in an idle state in the defer duration and additional duration during which a channel access procedure is to be performed, the BS may transmit a signal in the unlicensed band for the time T_mcot,p (8 ms).

Table 2 represents a channel access priority class for DL. Embodiments of the disclosure will be described below based on the DL channel access priority class for convenience of descriptions. The channel access priority class in Table 2 may be equally used for UL, or a separate channel access priority class for UL may be used.

TABLE 2

| Channel Access Priority Class (p) | $m_p$ | $CW_{min,p}$ | $CW_{max,p}$ | $T_{mcot,p}$ | allowed $CW_P$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 13 | 1023 | 8 or 10 ms | {15, 31, 63, 127, 255, 511, 1023} |

An initial contention window value CW_p is a minimum value CW_min,p of the contention window. After selecting a value of N, the BS may perform the channel access procedure during the interval T_sl (e.g., slot duration 620), and when the unlicensed band is determined to be in an idle state through the channel access procedure performed in the interval T_sl, the BS may change the value of N to be N=N−1 and may transmit a signal for the maximum T_mcot,p time (e.g., a maximum channel occupancy time 630) in the unlicensed band when N becomes 0 (N=0). When the unlicensed band determined through the channel access procedure is not in the idle state in the time T_sl, the BS may perform the channel access procedure again without changing the value of N.

The amount of the value of the contention window CW_p may be changed or maintained according to a ratio (Z) of NACK among results (ACK/NACK) of reception of DL data transmitted or reported to the BS by one or more UEs in a reference subframe, a reference slot, or a reference transmission time interval (reference Transmit Time Interval (TTI)), which have received DL data transmitted through a DL data channel in the reference subframe, the reference slot, or the reference TTI. In this case, the reference subframe, the reference slot, or the reference TTI may be determined as a point in time for the BS to initiate a channel access procedure, a point in time for the BS to select a value of N to perform the channel access procedure, the first subframe, slot, or TTI of the DL signal transmission interval (or MCOT) involved in the most recent transmission of the BS in the unlicensed band immediately before the two points in time, or a start subframe, start slot, or start TTI of the transmission interval.

The BS may attempt channel access to occupy the unlicensed band. A reference slot, a reference subframe, or a reference TTI may be determined as a point in time for the BS to initiate a channel access procedure 670, a point in time for the BS to select a value of N to perform the channel access procedure, or a first slot (or a start slot in which a channel occupancy interval starts), a start subframe, or a start TTI (640) of a DL signal transmission interval (i.e., MCOT 630) involved in the most recent transmission of the BS in the unlicensed band immediately before the point in time. For convenience of the description, the reference slot is referred to in the description below. In detail, the reference slot may be defined as a slot or one or more consecutive slots including the first slot in which a signal is transmitted from among all slots of the DL signal transmission interval (MCOT 630).

When the DL signal transmission interval (MCOT 630) starts after a first symbol of a slot, the slot in which DL signal transmission starts and a slot thereafter may be defined as the reference slot. A ratio of NACK in DL data reception results transmitted or reported to the BS by one or more UEs that received DL data transmitted in the reference slot through a DL data channel is greater than or equal to Z, the BS may determine a value or a size of a content window, which is to be used in the channel access procedure 670 of the BS, to be a contention window larger than a contention window used in a previous channel access procedure 602. That is, the BS may increase the size of the contention window used in the previous channel access procedure 602. The BS may perform the channel access procedure 670 by selecting an N value 622 in a range defined according to the increased size of the contention window.

When the BS is unable to obtain a reception result of a DL data channel transmitted in the reference slot of the MCOT 630, e.g., when a time interval between the reference slot and the point in time for the BS to initiate the channel access procedure 670 corresponds to n slot or is less than or equal to a symbol (that is, when the BS initiates a channel access procedure before a minimum period of time in which the UE can report, to the BS, the reception result of the DL data channel transmitted in the reference slot), a first slot of a DL signal transmission interval involved in the most recent transmission before the DL signal transmission interval (MCOT 630) may become the reference slot.

When the BS is unable to receive, from the UE, the reception result of the DL data transmitted in the reference slot 640 in the point in time for the BS to initiate the channel access procedure 670, the point of time the BS selects the N value to perform the channel access procedure, or a point of time immediately before, the BS may determine a contention window by using a DL data reception result of the UE with respect to the reference slot in the DL signal transmission interval of the most recent transmission from among reception results of a DL data channel which are previously received from UEs. The BS may determine the size of the contention window to be used in the channel access procedure 670, by using the DL data reception results of the DL data transmitted in the reference slot through the DL data channel, the results being received from the UEs.

After the BS transmits a DL signal through a channel access procedure (e.g., CW_p=15) configured based on the channel access priority class 3(p=3), when at least 80% of reception results from the UE with respect to DL data transmitted to the UE in the reference slot through the DL data channel, from among DL signals transmitted in the unlicensed band, is determined as NACK, the BS may increase the contention window from an initial value (CW_p=15) to a next contention window value (CW_p=31). However, a value of the ratio of 80% is merely an example, and thus may variously modified.

When at least 80% of the reception results from among reception results from the UE are determined to not be NACK, the BS may maintain the value of the contention window as its current value or may change the value of the contention window to its initial value of the contention window. The change of the contention window may be commonly applied to all channel access priority classes or may be applied only to the channel access priority class used for the channel access procedure. A method by which the BS determines a reception result efficient for the change of the size of the contention window, the reception result being among the DL data reception results transmitted or reported to the BS by the UE with respect to the DL data transmitted through the DL data channel in the reference slot where the change of the size of the contention window is determined, i.e., a method of determining a Z value, will now be described. However, the disclosure is not limited to an example below.

When the BS transmits one or more codewords (CWs) or TBs to one or more UEs in the reference slot, the BS may determine the Z value as a ratio of NACK from among reception results transmitted or reported to the BS by the UE with respect to the TBs received by the UE in the reference slot. For example, when two CWs or two TBs are transmitted in the reference slot to one UE, the BS may receive or be reported DL data signal reception results with respect to the two TBs from the UE. When a ratio (Z) of NACK among the two reception results is greater than or equal to a threshold value (e.g., Z=80%) that is predefined or is configured between the BS and the UE, the BS may change or increase the size of the contention window.

When the UE bundles DL data reception results with respect to one or more slots (e.g., M slots) including the reference slot and transmits or reports a bundled reception result to the BS, the BS may determine that the UE has transmitted M reception results. The BS may determine a Z value as a ratio of NACK among the M reception results, and may change, maintain, or reset the size of the contention window.

When the reference slot is a second slot among the two slots included in one subframe, or a DL signal is transmitted in a next symbol after a first symbol starting from the reference slot, the BS may determine the reference slot and the next symbol as a reference slot, and may determine a Z value as a ratio of NACK among reception results transmitted or reported to the BS by the UE with respect to DL data received in the reference slot.

When scheduling information or DCI for a DL data channel to be transmitted by the BS is transmitted by a cell or frequency band equal to a cell or frequency band in which the DL data channel is transmitted, or when the scheduling information or the DCI for the DL data channel to be transmitted by the BS is transmitted in the unlicensed band but is transmitted by a cell or frequency different from a cell by which the DL data channel is transmitted, when it is determined that the UE has not transmitted a reception result of DL data received in the reference slot, and when it is determined that a DL data reception result transmitted by the UE is determined as at least one of discontinuous transmission (DTX), NACK/DTX, or any state, the BS may determine a Z value by determining the reception result from the UE as NACK.

When the scheduling information or the DCI for the DL data channel to be transmitted by the BS is transmitted in a licensed band, and it is determined that a DL data reception result transmitted by the UE is determined as at least one of DTX, NACK/DTX, or any state, the BS may not reflect the reception result from the UE to Z that is a reference value in the change of the contention window. That is, the BS may discard (ignore) the reception result from the UE and may determine a Z value.

When the scheduling information or the DCI for the DL data channel to be transmitted by the BS is transmitted in the licensed band, and reception results of DL data with respect to the reference slot transmitted or reported to the BS by the UE includes a case where the BS did not actually transmit DL data (no transmission), the BS may discard the reception results of DL data transmitted or reported to the BS by the UE and may determine a Z value.

Figure 7:
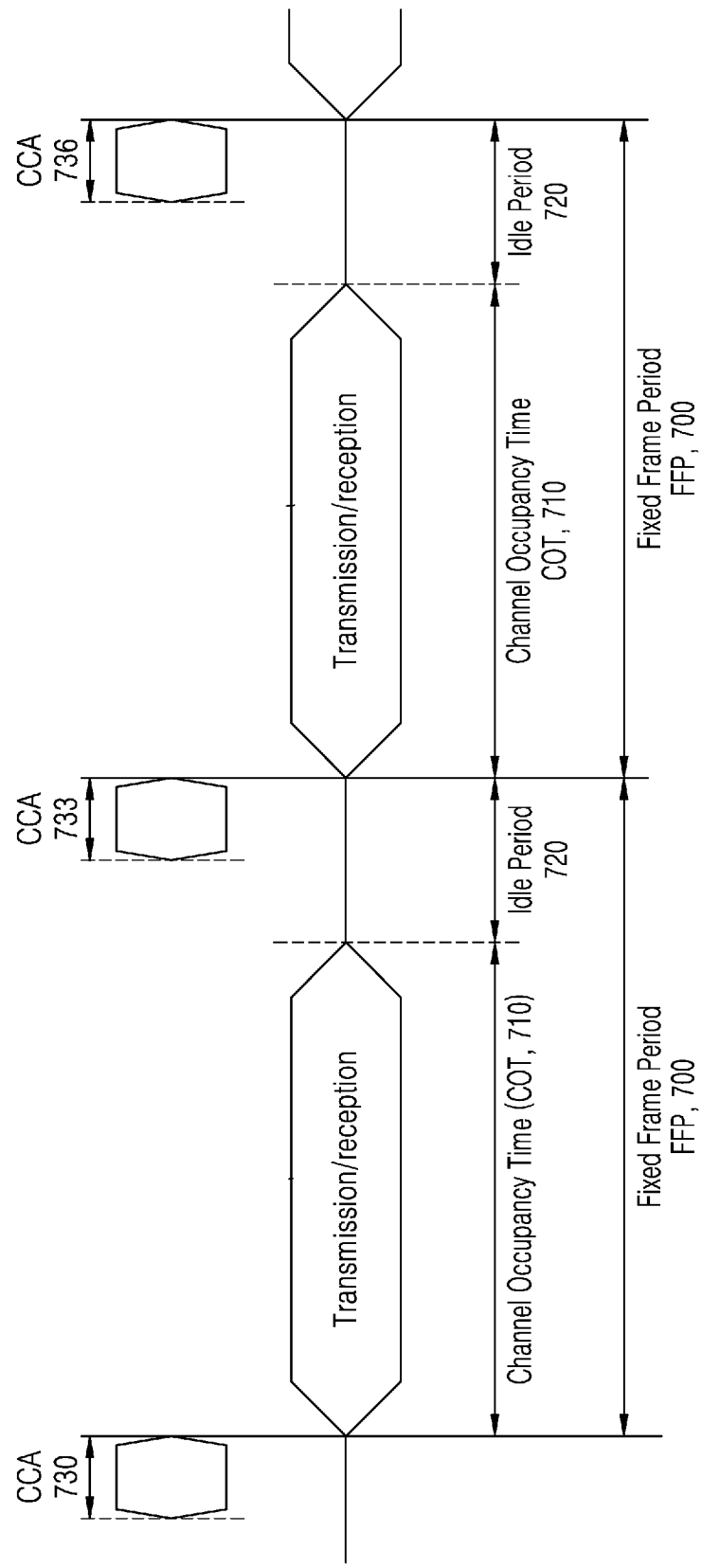
FIG. 7 illustrates a channel access procedure in an unlicensed band in a wireless communication system, according to an embodiment.

FIG. 7 illustrates a channel access procedure in an unlicensed band in a wireless communication system, according to an embodiment.

Referring to FIG. 7, a communication apparatus that performs the frame-based channel access procedure may periodically transmit and receive signals according to a fixed frame period (FFP) 700. The FFP 700 may be declared or configured by the communication apparatus (e.g., a BS), and may be configured between 1 ms and 10 ms. The channel access procedure (or a clear channel access (CCA)) for the unlicensed band may be performed immediately before the start of every frame period 730, 733, or 736, and the channel access procedure may be performed during a fixed period of time or one observation slot as in the channel access procedure of Type 2. Based on a result of the channel access procedure, when it is determined that the unlicensed band is in an idle state or is an idle channel, the communication apparatus may transmit or receive a signal without separately performing a channel access procedure during at most 95% of a time of the FFP 700 (hereinafter, the COT 710). In this regard, at least 5% of the time of the FFP 700 corresponds to an idle period 720 during which a signal cannot be transmitted or received, and a channel access procedure may be performed in the idle period 720.

The frame-based channel access procedure has advantages in that, compared to a traffic-based channel access procedure, the frame-based channel access procedure may be relatively simple and may periodically perform a channel access to the unlicensed band. However, because the time to start the channel access procedure is fixed, the frame-based channel access procedure has disadvantages in that a probability to access the unlicensed band is reduced, compared to the traffic-based channel access procedure.

Figure 8:
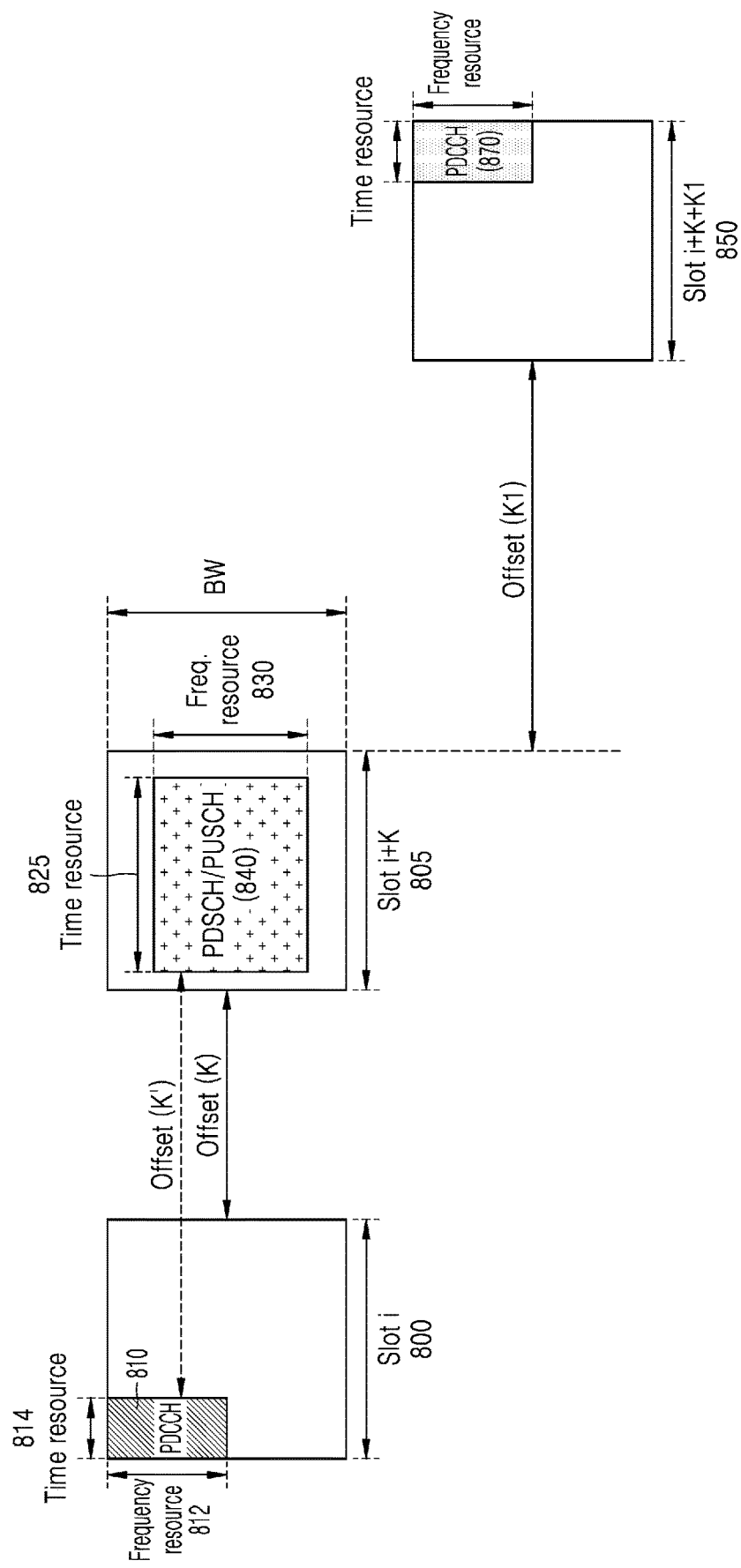
FIG. 8 illustrates scheduling and feedback in a wireless communication system, according to an embodiment.

FIG. 8 illustrates scheduling and feedback in a wireless communication system, according to an embodiment.

A BS may transmit control information including DL and/or UL scheduling to a UE. The BS may transmit DL data to the UE. The UE may transmit, to the BS, HARQ-ACK information that is feedback on the DL data. Alternatively, the UE may transmit UL data to the BS.

In the NR system, a UL and DL HARQ scheme may include an asynchronous HARQ scheme in which a point of time for data retransmission is not fixed. For example, for a DL, when the BS receives HARQ NACK as feedback on initial transmission data from the UE, the BS may arbitrarily determine a point of transmission time for data to be retransmitted, according to a scheduling operation. The UE may perform buffering on data determined as an error according to a result of decoding on reception data for a HARQ operation, and then may combine the buffered data with data retransmitted from the BS.

Referring to FIG. 8, a resource domain in which a data channel is transmitted in the 5G or NR communication system is illustrated. The UE may monitor and/or search for a PDCCH 810 in a DL control channel (e.g., a PDCCH) domain (hereinafter, a control resource set (CORESET) or a search space (SS)) configured in an upper signal from the BS. The PDCCH domain consists of time resource domain information 814 and frequency resource domain information 812, and the time resource domain information 814 may be configured as a symbol unit, and the frequency resource domain information 812 may be configured as an RB or a group unit of RBs.

When the UE detects the PDCCH 810 in a slot i 800, the UE may obtain DCI transmitted through the detected PDCCH 810. The UE may obtain, from the received DCI, scheduling information of a DL data channel or UL data channel 840. That is, the DCI may include at least information of a resource domain (or a PDSCH transmission region) in which the UE is requested to receive a DL data channel (or a PDSCH) transmitted from the BS, or information of a resource domain allocated from the BS to the UE for transmission of a UL data channel (or a physical UL shared channel (PUSCH)).

A case in which the UE is scheduled for transmission of the UL data channel (or PUSCH) will now be described as an example.

Upon reception of the DCI, the UE may obtain, from the DCI, a slot index or offset information (K) related to reception of the PUSCH, and may determine a slot index for reception of the PUSCH. The UE may determine that the UE is scheduled to transmit the PUSCH in a slot i+K 805, according to the received offset information (K) based on the received slot i 800 in which the PDCCH 810 is received. The UE may determine, based on the CORESET in which the PDCCH 810 is received, the slot i+K 805 or a PUSCH start symbol or time in the slot i+K 805, based on the received offset information (K).

The UE may obtain, from the DCI, information about PUSCH transmission time-frequency resource domain 840 in the PUSCH transmission slot 805. PUSCH transmission frequency resource domain information 830 may include information of a PRB or a group unit of PRBs. The PUSCH transmission frequency resource domain information 830 may be information about a domain included in an initial UL bandwidth (BW) or an initial UL BWP, which is determined or configured via an initial access procedure. When the UE is configured with a UL BW or a UL BWP through an upper signal, the PUSCH transmission frequency resource domain information 830 may be information about a domain included in the UL BW or the UL BWP which is configured through an upper signal.

PUSCH transmission time resource domain information 825 may be information about a symbol or a group unit of symbols or may be information indicating absolute time information. The PUSCH transmission time resource domain information 825 may be represented with a PUSCH transmission start time, lengths of a symbol and PUSCH, a PUSCH transmission end time, or a combination of symbols and may be added as one field or value in the DCI. The UE may transmit the PUSCH in a PUSCH transmission resource domain 840 determined from the DCI.

Upon reception of the PDSCH 840, the UE may transmit feedback on a reception result (e.g., HARQ-ACK/NACK) of the PDSCH 840 to the BS. The UE may determine a transport resource for a UL control channel (e.g., a PUCCH) 870 in which the reception result of the PDSCH 840 is transmitted, based on a PDSCH-to-HARQ timing indicator and a PUCCH resource indicator which are indicated by DCI 810 that schedules the PDSCH 840. That is, when the UE receives, from the DCI 810, K1 that is the PDSCH-to-HARQ timing indicator, the UE may transmit the PUCCH 870 in a slot i+K+K1 850 after K1 starting from the reception slot 805 of the PDSCH 840.

The BS may configure, through higher layer signaling, one or more K1 values for the UE, or, as described above, may indicate, through the DCI, a particular K1 value to the UE. K1 may be determined based on HARQ-ACK processing capacity of the UE, i.e., based on a minimum period of time in which the UE receives a PDSCH, and generates and reports HARQ-ACK about the PDSCH. Before the UE is configured with the K1 value, the UE may use a predefined value or a default value as the K1 value.

A transport resource for the PUCCH 870 in the PUCCH transmission slot 850 may involve PUCCH transmission in a resource indicated by a PDCCH resource indicator in the DCI 810. When a plurality of PUCCH transmissions are configured or indicated for the PUCCH transmission slot 850, the UE may perform PUCCH transmission in a PUCCH resource other than the resource indicated by the PDCCH resource indicator.

In the 5G communication system, to dynamically change a DL signal transmission interval and a UL signal transmission interval in a time division duplex (TDD) system, information about whether each of OFDM symbols constituting one slot is a DL symbol, a UL symbol, or a flexible symbol may be indicated by an SFI. A symbol indicated as a flexible symbol may be neither of DL nor UL symbols or may be a symbol that may become a DL symbol or a UL symbol, in response to UE-specific control information or scheduling information. The flexible symbol may include a gap guard for a procedure of transitioning from DL to UL.

The SFI may be simultaneously transmitted to a plurality of UEs through a UE group (or cell) common control channel. That is, the SFI may be transmitted through a PDCCH that is CRC-scrambled by a UE-specific identifier (C-RNTI) and a different identifier (e.g., SFI-RNTI). The SFI may include information about N slots, where N may be an integer or a natural number greater than 0 or may be a value in a set of predefined available values including 1, 2, 5, 10, 20, etc., the value being configured by the BS to the UE through an upper signal. The BS may configure a size of information of the SFI to the UE through the upper signal. Examples of a slot format which may be indicated by the SFI are shown in Table 3 below.

TABLE 3

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 1 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | F | U | D | D | D | D | D | D | F | U |
| 47 | D | D | F | U | U | U | U | D | D | F | U | U | U | U |

TABLE 3-continued

| Format | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-Configurationcommon, or TDD-UL-DL-ConfigDedicated and, if any, on detected DCI formats | | | | | | | | | | | | | |

In Table 3, D represents DL, U represents UL, and F represents a flexible symbol. In Table 3, a total number of available slot formats is 256. In the current NR system, a maximum size of an SFI information bit is 128 bits. The SFI information bit refers to a value that is configurable in an upper signal (e.g., dci-PayloadSize) by the BS to the UE. A cell that operates in an unlicensed band may configure and indicate additional slot formats as shown in Table 4 below by introducing one or more additional slot formats or modifying at least one of existing slot formats.

Table 4 shows examples of a slot format by which one slot is configured of UL (U) and a flexible symbol (F).

TABLE 4

| | Symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

The SFI information may include slot formats of a plurality of serving cells, and the slot formats of the serving cells may be identified by respective serving cell IDs. A slot format combination of SFIs for one or more slots may be included with respect to each serving cell. For example, when a size of the SFI information is 3 bits and the SFI information is configured of an SFI for one serving cell, the SFI information of 3 bits may be one of 8 SFIs or SFI combinations (hereinafter, the SFI), and the BS may indicate one SFI among the 8 SFIs through UE group common DCI (hereinafter, the SFI information).

At least one SFI of the 8 SFIs may be configured as an SFI for a plurality of slots. Table 5 below shows examples of the 3-bit SFI information configured as a slot format in Table 4.5 slot format combination IDs among the SFI information (slot format combination ID 0, 1, 2, 3, 4) correspond to SFIs for one slot, and remaining 3 slot format combination IDs (slot format combination ID 5,6,7) may correspond to SFIs for 4 slots and may be sequentially applied to the 4 slots.

TABLE 5

| Slot format combination ID | Slot Formats |
|---|---|
| 0 | 0 |
| 1 | 1 |

TABLE 5-continued

| Slot format combination ID | Slot Formats |
|---|---|
| 2 | 2 |
| 3 | 19 |
| 4 | 9 |
| 5 | 0 0 0 0 |
| 6 | 1 1 1 1 |
| 7 | 2 2 2 2 |

The UE may receive, through an upper signal, configuration information about a PDCCH in which the UE is requested to detect SFI information, and may detect an SFI, based on the configuration information. The UE may be configured, through the upper signal, with at least one of configuration of CORESET in which the UE is requested to detect the SFI information, search space configuration, RNTI information used in CRC scrambling of DCI carrying the SFI information, a search space period, or offset information.

Figure 9A:
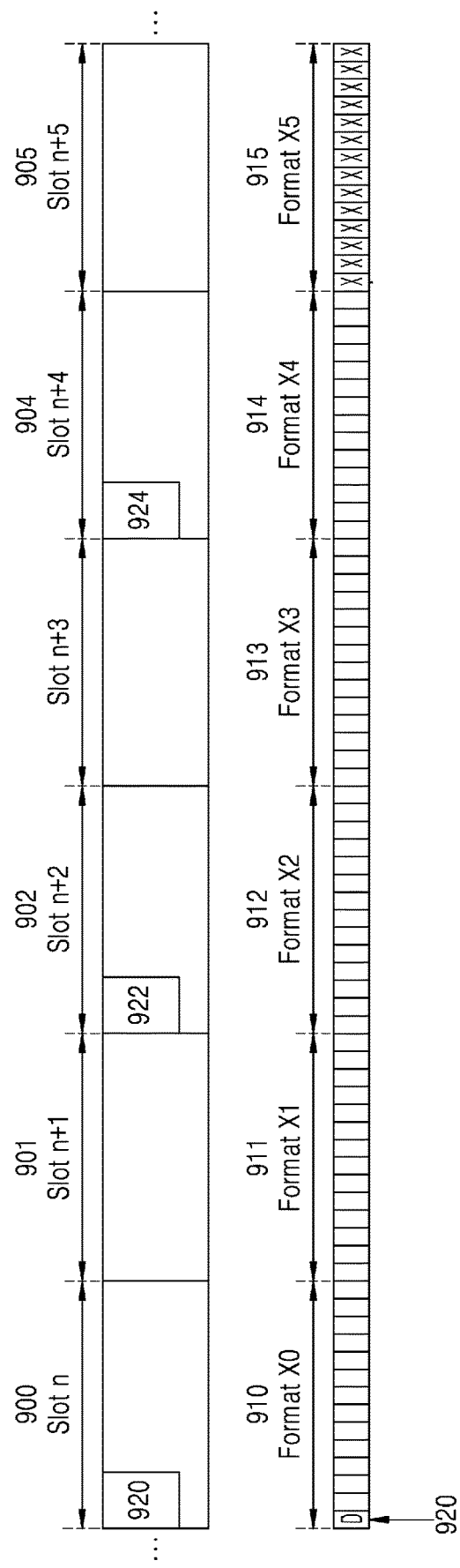
FIG. 9A illustrates a COT and a slot format in a wireless communication system, according to an embodiment.

FIG. 9A illustrates a COT in a wireless communication system, according to an embodiment.

Referring to FIG. 9A, a UE is requested to detect SFI information from PDCCH regions 920, 922, and 924, in which a PDCCH region period corresponds to 2 slots. In response to a configured PDCCH region and its period, the UE may detect DCI that is CRC-scrambled by an SFI identifier (e.g., SFI-RNTI or new RNTI) from the PDCCH regions 920, 922, and 924 (or a CORESET) in a slot n 900, a slot n+2 902, and a slot n+4 904, and may obtain an SFI for two slots from the detected DCI. The detected DCI may include SFI information of at least two slots, and an indication of how many slots are to be indicated by the SFI included in the DCI may be configured through an upper signal. Configuration information about how many slots are to be indicated by the SFI included in the DCI may be included in the upper signal by which the SFI information is configured.

For example, the UE may obtain a plurality of pieces of SFI information 910 and 911 for the slot n 900 and a slot n+1 901 from the PDCCH region 920 of the slot n 900. A plurality of pieces of SFI information 910, 911, 912, 913, and 914 may have at least one value among formats of Table 3. However, it is also possible to have a new format other than the formats of Table 3.

When a BS transmits SFI information in an unlicensed band, in particular, when the SFI information includes SFIs for a plurality of slots, the BS may not be able to determine SFI information for at least one slot, in response to whether or not a channel access to the unlicensed band is active.

When the BS transmits a plurality of pieces of SFI information 914 and 915 for a slot n+4 904 and a slot n+5 905, it is requested for the BS to determine how SFI information for the slot n+5 905 is to be indicated. For example, the BS may indicate that an SFI for a period of time other than a COT is flexible.

Hereinafter, a method of allocating UL resources will be described.

A UL resource that transmits a signal or data may be consecutively or inconsecutively allocated, and when a particular resource allocation type is determined, information indicating UL resource allocation may be interpreted based on the particular resource allocation type. In the 3GPP standard, a signal and a channel are used separately, but in the disclosure, a UL transmission signal or a UL transmission channel may not be separated but may be interchangeably used, or the UL transmission signal may be used to indicate or represent both the UL transmission signal and the UL transmission channel. This is because a scheme of determining a UL resource allocation type or a position to start UL transmission, as described in the disclosure, may be commonly applied to both the UL transmission signal and the UL transmission channel. In this case, without extra classification or descriptions, the scheme of determining a UL resource allocation type or a position to start UL transmission, which are proposed in the disclosure, may be independently applied to each of the UL transmission signal and the UL transmission channel.

UL Resource Allocation Type 0

The UL resource allocation type 0 scheme allocates a resource in an RB group (RBG) unit consisting of P consecutive RBs. P is a size of an RBG and may be configured to be one of Configuration 1 and Configuration 2 through an upper signal, e.g., a value of rbg-size of pusch-Config, and P may be determined based on one of a plurality of pieces of information included in the upper signal and a size of an activated UL BWP as shown in Table 6.

Table 6 represents a size of P based on a size of a BWP and an RBG setting value. The size of the BWP denotes the number of PRBs that constitute the BWP.

TABLE 6

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The number $N_{RBG}$ of RBGs that constitute a UL BWP $N_{BWP}$ may be determined to be $N_{RBG}$=ceiling ($N_{BWP}^{size}$+$N_{BWP}^{start}$ mod P)/P). A size of the first RBG ($RBG_0$) is P-$N_{BWP}^{start}$ mod P. When a value of ($N_{BWP}^{start}$+$N_{BWP}^{size}$) mod P is greater than 0, a size of the last RBG ($RBG_{last}$) is ($NB_{BWP}$+$N_{BWP}^{size}$) mod P, and when a value of ($N_{BWP}^{start}$+$N_{BWP}^{size}$) mod P is not greater than 0, the last RBG ($RBG_{last}$) has a size of P.

A size of an RBG other than the first and last RBGs is P. In this case, $N_{BWP}^{start}$ refers to a CRB at which the BWP is started relatively from CRB0, which may be understood as a point at which a particular BWP is started in the CRB. $N_{BWP}^{Size}$ refers to the number of RBs included in the BWP.

A length (or a size or the number of bits) of frequency resource allocation information is equal to $N_{RBG}$, and the UE may be configured or scheduled in an RBG unit with a resource in which UL transmission is configured or scheduled for each RBG through a bitmap configured of $N_{RBG}$ bits. For example, the UE may determine that an RBG region configured as 1 in the bitmap is a resource allocated for UL transmission, and that an RBG region configured as 0 is not a resource allocated for UL transmission. The RBG bitmap is arrayed and mapped sequentially (in ascending order) on an axis where frequency increases. Consecutive or inconsecutive RBGs may be allocated for UL transmission.

UL Resource Allocation Type 1

The UL resource allocation type 1 scheme allocates consecutive frequency resources in an activated UL BWP. Frequency resource allocation information of the UL resource allocation type 1 scheme may be indicated to the UE through a resource indication value (RIV). A length (or a size or the number of bits) of the frequency resource allocation information is equal to ceiling($\log_2$ ($N_{BWP}$($N_{BWP}$+1)/2). The RIV indicates a starting RB ($RB_{start}$) for frequency resource allocation and L consecutively allocated RBs ($L_{RB}$). However, the disclosure is not limited thereto.

$$\text{If } (L_{RBs} - 1) \leq \left\lfloor \frac{N_{BWP}}{2} \right\rfloor \text{ then } RIV = N_{BWP}(L_{RBs} - 1) + RB_{start}$$

$$\text{Else, } RIV = N_{BWP}(N_{BWP} - L_{RBs} - 1) + (N_{BWP} - 1 - RBstart)$$

$$\text{where, } L_{RBS} \geq 1 \text{ and shall not exceed } N_{BWP} - RBstart$$

where $N_{BWP}$ denotes a size of an activated UL BWP, which is expressed by the number of PRBs, $RB_{start}$ denotes the first PRB at which UL resource allocation is started, and $L_{RB}$ denotes a length or the number of consecutive PRBs. When one of pieces of DCI (hereinafter, UL grant) that configures or schedules UL transmission, e.g., DCI format 0_0, is transmitted in common search space (CSS), initial UL BWP size $N_{BWP,0}$ is used.

For a DCI format among UL grant, e.g., DCI format 0_0 transmitted in a UE-specific common search space (USS), a size or the number of bits of frequency resource allocation information for UL grant is determined based on the size of an initial BWP ($N_{initial,BWP}$), but when the UL grant is DCI that schedules another activated BWP, an RIV value is $RB_{start}$=0, K, 2K, . . . , ($N_{initial,BWP}$-1)·K and $L_{RB}$=K, 2K, . . . , $N_{initial,BWP}$·K and may be configured as below.

$$\text{If } (L'_{RBs} - 1) \leq \left\lfloor \frac{N_{initial,BWP}}{2} \right\rfloor \text{ then } RIV = N_{initial,BWP}(L'_{RBs} - 1) + RB'_{start}$$

Else, $$RIV = N_{initial,BWP}(N_{initial,BWP} - L'_{RBs} - 1) + (N_{initial,BWP} - 1 - RB'start)$$

$$\text{where, } L'_{RBs} = \frac{L_{RBS}}{K}, RB'start = \frac{RBstart}{K}, L'_{RBs} = N_{initial,BWP} - RB'start$$

UL Resource Allocation Type 2

The UL resource allocation type 2 scheme allocates resources such that frequency resources for transmission of a UL signal or channel are distributed in an entire activated UL BWP, in which case a distance or a gap between the allocated frequency resources is equal. With the UL resource allocation type 2, resources are allocated uniformly across the entire frequency band, so that the UL resource allocation type 2 may be limitedly applied in UL signal and channel transmission with a carrier, cell, or BWP operating in an unlicensed band requested to satisfy requirements for power spectral density (PSD) and for frequency allocation such as an occupancy channel bandwidth (OCB) condition.

Figure 9B:
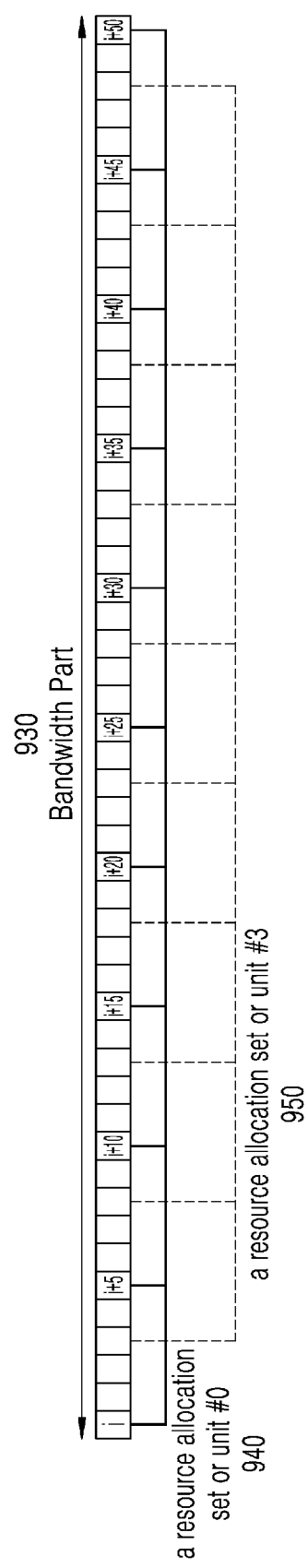
FIG. 9B illustrates a frequency resource allocation type in a wireless communication system, according to an embodiment.

FIG. 9B illustrates a frequency resource allocation type in a wireless communication system, according to an embodiment.

Referring to FIG. 9B, a UE is configured to perform UL signal transmission or reception with a BS in a BWP 930 and is scheduled with UL data channel transmission in the UL resource allocation type 2 scheme. In this regard, it is assumed that the BWP 930 consists of 51 PRBs. According to the UL resource allocation type 2 scheme, 51 PRBs may configure L (L=5 in FIG. 9B) resource allocation sets, and each of the resource allocation sets may consist of.

$$N = \left\lfloor \frac{N_{,BWP}}{L} \right\rfloor \text{ or } N = \left\lfloor \frac{N_{,BWP}}{L} \right\rfloor + 1 \text{ PRBs}.$$

In FIG. 9B, the first resource allocation set 940 includes 11 PRBs (#i, #i+5, #i+10, #i+15, ..., #i+45, #i+50), and the other resource allocation set, for example, a third resource allocation set 950, may include 10 PRBs (#i+3, #i+8, #i+13, #i+18, ..., #i+48).

The number of PRBs included in a resource allocation set may differ according to the size of the BWP or the number of PRBs in the BWP. The UE may be allocated one or more resource allocation sets configured as described above, and may be allocated consecutive resource allocation sets (e.g., resource allocation sets #0, #1, or #2, #3, #4) through a method similar to the UL resource allocation type 1 scheme (e.g., allocation based on the RIV value), or may be allocated consecutive or inconsecutive resource allocation sets in a similar manner to the UL resource allocation type 0 scheme (e.g., allocation based on a bitmap).

When the UE is allocated consecutive resource allocation sets, the UE may determine in a similar manner to the UL resource allocation type 1, a frequency resource domain (or a resource allocation set) allocated with the RIV expressed with a start resource allocation set $RB_{start}$ for frequency resource allocation and L consecutive resource allocation sets, and in this regard, the RIV is as below.

$$\text{If } (L-1) \le \left\lfloor \frac{N}{2} \right\rfloor \text{ then } RIN(L-1) + RB_{start}$$

$$\text{Else, } RIV = N(N-L-1) + (N-1-RB_{start})$$

For example, RIV=0 indicates the first resource allocation set or the resource allocation set #0, indicating that a resource allocation set consisting of PRBs #i, #i+10, #i+20, ..., #i+50 of FIG. 9B has been allocated. In this case, a length (or a size or the number of bits) of frequency resource allocation information is equal to ceiling($\log_2$ (L(L+1)/2).

When the UE is allocated consecutive or inconsecutive resource allocation sets by using a bitmap, the bitmap may be configured in L bits respectively indicating L resource allocation sets, which configure the BWP 930, in ascending frequency resource order or in ascending order of resource allocation set indexes, and the BS may allocate the resource allocation sets through the bitmap. For example, in FIG. 9B, with the bitmap configured in 5 bits, a position of a resource allocation set may be indicated through a bitmap, and in this regard, bitmap '10000' indicates that a first domain set, i.e., a resource allocation set consisting of PRB #i, #i+10, #i+20, ..., #i+50 of FIG. 9B is allocated. Bitmap 00010 indicates that the fourth resource allocation set, i.e., a resource allocation set consisting of PRB #i+3, #i+8, #i+13, #i+18, ..., #i+48 of FIG. 9B is allocated. In this case, a length (or a size or the number of bits) of frequency resource allocation information is equal to L.

UL Resource Allocation Type 3

Figure 9C:
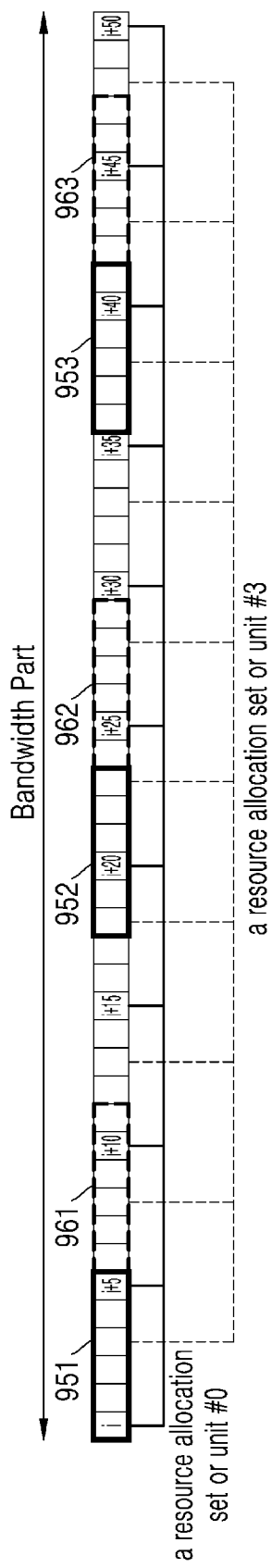
FIG. 9C illustrates a frequency resource allocation type in a wireless communication system, according to an embodiment.

FIG. 9C illustrates a frequency resource allocation type in a wireless communication system, according to an embodiment. Specifically, FIG. 9C illustrates the UL resource allocation type 3.

Referring to FIG. 9C, the UL resource allocation type 3 scheme allocates resources such that frequency resources for transmission of a UL signal or channel are distributed over an entire activated UL BWP, in which case an allocated-resource group (or an allocated-resource block or an allocated-resource cluster) (e.g., an allocated-resource group 951 or 961) that is a consecutive resource is overall distributed in a BWP in a manner of repetitive transmission or the like (e.g., allocated-resource groups 951, 952, and 953 to allocated-resource groups 961, 962, and 963). That is, the allocated-resource group 951 that is the consecutive resource may repetitively exist in frequency resources (e.g., the allocated-resource groups 951, 952, and 953), and thus, a plurality of allocated-resource groups may exist in the BWP. With the UL resource allocation type 3, consecutive allocated-resource groups (or allocated-resource blocks or clusters) are distributed in a frequency band, so that the UL resource allocation type 3 may be limitedly applied in UL signal and channel transmission with a carrier, cell, or BWP operating in an unlicensed band requested to satisfy requirements for PSD and for frequency allocation such as an OCB condition.

In a similar manner to the frequency, the UE may be configured with a time resource domain of a UL data channel in the following method. The time resource domain of the UL data channel may be indicated to the UE through a start and length indicator value (SLIV). The SLIV is determined by a start symbol S for time resource allocation and L symbols consecutively allocated in a slot. When (L−1) is less than or equal to 7, the SLIV is 14·(L−1)+S, and when (L−1) is greater than 7, the SLIV is 14·(14−L+1)+(14−1−S). In this case, L has a value greater than 0 and less than or equal to 14.

In addition, the UE may be indicated by the BS with respect to a UL signal or channel transmission start position or time (hereinafter, the position) to transmit a UL signal in an unlicensed band, or the UE may determine the position. For example, the UE may be indicated or configured, by the BS through DCI or an upper signal, with a start symbol of UL signal transmission and a length of the UL signal transmission in a particular slot by the UE or the start symbol of the UL signal transmission and an end symbol of the UL signal transmission. The UE may be additionally configured with a transmission start position in a first symbol of the indicated or configured UL signal transmission.

At least one DCI format from among DCI formats for transmitting DCI may be a DCI format including an SFI field. In this regard, the DCI format including the SFI field may transmit group common control information to one or more UE groups.

The UE may be configured to receive or search and detect the DCI format including the SFI field, through an upper signal (e.g., SlotFormatIndicator). The DCI format may include an SFI for one or more serving cells (e.g., a set of serving cells configured through slotFormatCombToAdd-ModList). The DCI format may be transmitted to the UE from at least one cell or another cell in the set of serving cells. A cell that transmits SFI information related to one or more serving cells or DCI, the DCI from the cell to be received by the UE, is referred to as Cell 1, and a cell that obtains and determines the SFI information through the DCI transmitted from Cell 1 is referred to as Cell 2.

When not separately described in the disclosure, the DCI format refers to DCI including at least SFI field, and the DCI refers to a signal that is transmitted through a group common CORESET or a group common search space and is CRC scrambled by RNTI configured through an upper signal. Further, when not separately described in the disclosure, the UE is configured, through an upper signal (e.g., SlotFormatIndicator), to receive or search and detect the DCI format including at least SFI field. However, the disclosure is not limited thereto.

Embodiment 1

In Embodiment 1, it is assumed that an additional field for notifying information about a COT exists in an SFI field of a DCI format. The COT refers to a period of time in which a BS that attempts to perform communication with a UE by using an unlicensed band performs a channel access procedure to occupy the unlicensed band and then performs communication. The COT may be represented with a symbol unit. A value indicated through a COT field may be a value of one of configured X COTs the BS can indicate to the UE through an upper signal. The BS may predefine a size of the COT field to be 8 bits, or may configure a size of the COT field through an upper signal and may indicate one of at most available 64 COT values or the number of symbols to the UE through DCI.

The UE is indicated, through the DCI, one of the values configured through the upper signal, and may determine a COT of the BS. That is, the UE may determine that a period of time or symbols starting from a first symbol at which the DCI including the COT field is transmitted or received to a time or symbol of COT information indicated by the DCI is the COT of the BS. Based on the determined COT information, the UE may differently determine a channel access procedure type to be performed for transmission of UL indicated through UL/DL scheduling information or UL transmission configured through the upper signal, depending on whether or not the UL transmission is performed within the COT of the BS, or may change the channel access procedure type. The UE may be indicated, through the UL/DL scheduling information, to use the channel access procedure type 3 for the UL transmission.

When the UL transmission can be performed within the COT of the BS, the UE may perform the channel access procedure type 1 or the channel access procedure type 2, and according to a result thereof, the UE may or may not perform the UL transmission. When the UL transmission is initiated in 16 µs or 16 µs+TA time immediately after a symbol in which DL transmission by the BS is ended, the UE may perform the channel access procedure type 1. When the UL transmission is initiated after 16 µs or 16 µs+TA time immediately after a symbol in which DL transmission by the BS is ended, the UE may perform the channel access procedure type 2. That is, for the UL transmission performed in the COT of the BS, the UE may switch to the channel access procedure type 2 as an indicated or configured channel access procedure and perform the channel access procedure, and may or may not perform the UL transmission, in response to a result of the channel access procedure.

Figure 10:
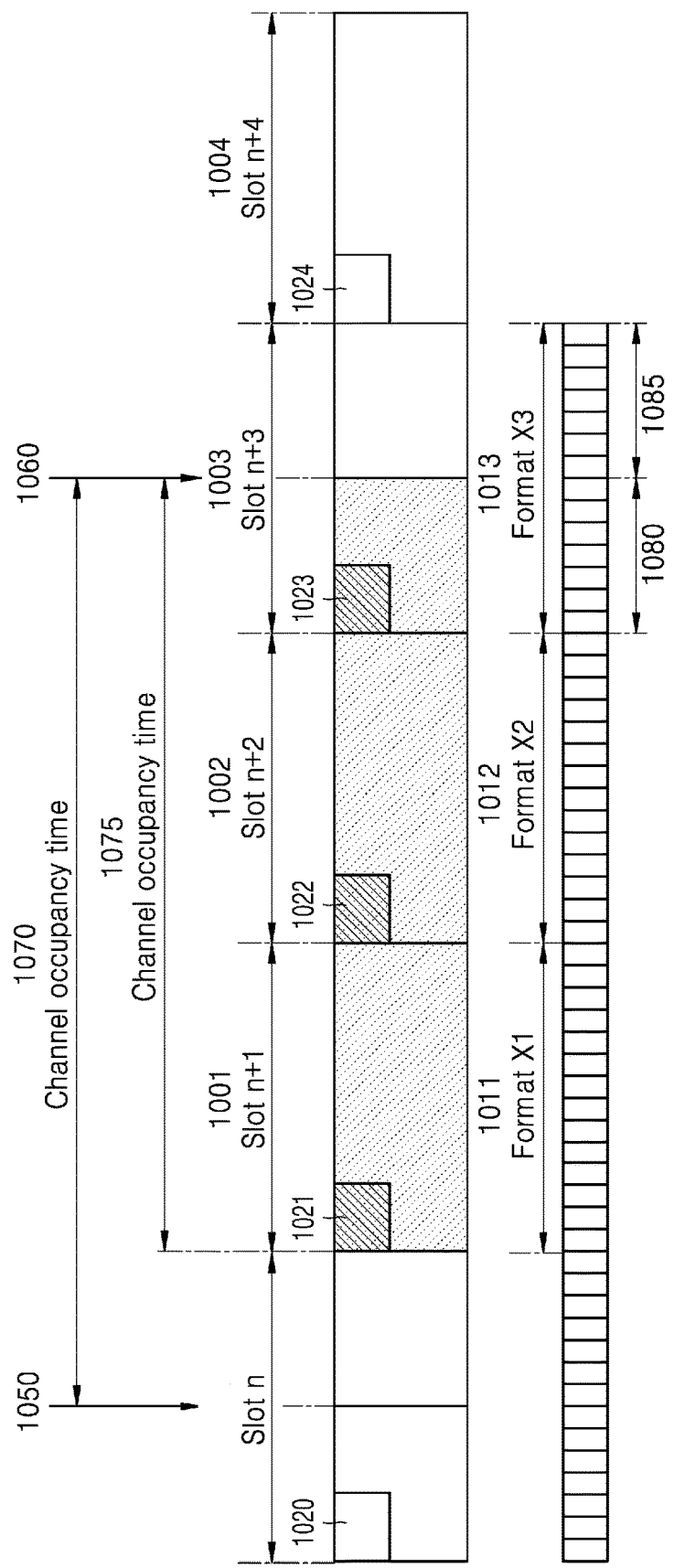
FIG. 10 illustrates a time resource allocation type in a wireless communication system, according to an embodiment.

FIG. 10 illustrates a time resource allocation type in a wireless communication system, according to an embodiment.

Referring to FIG. 10, when the BS attempts to perform communication with the UE by occupying a period of time after the channel access procedure is completed, e.g., an unlicensed band from a first time or symbol 1050 to a second time or symbol 1060, a COT of the BS corresponds to 42 symbols 1070. The BS may transmit, through a DCI format, COT information in a DL control channel transmission region or CORESET 1021.

Because the COT information is transmitted through the DCI format in the DL control channel region 1021 of a slot n+1 1001, a COT thereof may be less than or equal to 35 symbols 1075. The BS may transmit, to the UE through the DCI format, that the COT information corresponds to 24 symbols in the DL control channel region 1021 of the slot n+1 1001, and may transmit, to the UE, that it is 21 symbols in a DL control channel region 1022 and it is 7 symbols in a DL control channel region 1023. The UE may determine a COT of the BS to be a duration (period) from a first symbol in which received DCI has been transmitted to COT information indicated by the DCI. The BS may transmit, to the UE through the DCI, the COT information and SFI information about slots included in the COT.

The BS may transmit, through the DCI format, an SFI X1 1011 for at least a slot n+1 1001 in the DL control channel region 1021 of the slot n+1 1001. The BS may transmit, through the DCI, the SFI X1 1011 for at least the slot n+1 1001 and an SFI X2 1012 for a slot n+2 1002. The COT of the BS may be initiated or ended in any symbol of a slot. However, because an SFI can indicate a slot format for a slot or 14 symbols, a case where the SFI indicates a time other than the COT of the BS may occur. For example, the COT of the BS when the BS transmits an SFI X3 1013 for a slot n+3 1003 to the UE corresponds to when the COT is ended within the slot n+3 1003. The BS may use a time after the COT of the BS by performing a channel access procedure again to re-occupy a channel, or another UE or BS may occupy and use the channel, and therefore, the SFI information in a time other than the COT of the BS is invalid information. That is, when the UE receives DCI with an SFI field where an additional field for notifying COT information exists, the UE may discard or may not apply SFI information about symbols 1085 outside the COT, which is indicated by the DCI. The UE may determine that SFI information indicated by the DCI is valid only for symbols 1080 included within the COT indicated by the DCI, and may determine that SFI information for the symbols 1085 outside the COT is not provided nor indicated or may determine that it failed to detect the DCI, and may operate as below with respect to the symbols 1085 and slot or symbols 1004 outside the COT.

The UE may perform a channel access procedure according to a channel access procedure type indicated or configured by the BS, and according to a result thereof, the UE may or may not perform UL transmission.

The UE may receive a DL data channel or a channel state information-reference signal (CSI-RS) indicated through another DCI (e.g., ULDL scheduling DCI).

The UE may transmit a UL data channel, a UL control channel, a physical random access channel (PRACH), or a sounding reference signal (SRS), which is indicated by another DCI (e.g., ULDL scheduling DCI or DCI indicating transmission of the SRS).

The UE may receive and detect a PDCCH through a configured CORESET and control space in the symbols.

The UE may receive and detect a PDCCH through a configured CORESET and control space in the symbols.

The UE may not receive a PDSCH or a CSI-RS which is configured, through an upper signal, for the UE to receive.

When the UE determines that the SFI information is not provided or indicated through an upper signal (e.g., Cat4LBT-Exception), or is configured to transmit an SRS, a PUCCH, a PUSCH, or a PRACH which are configured, through an upper signal, for the UE to transmit in symbols for which DCI that transmits SFI information is not received, the UE may transmit, in the symbols 1085, the SRS, the PUCCH, the PUSCH, or the PRACH that are configured through the upper signal for the UE to transmit. The UE that is not provided the upper signal (e.g., Cat4LBT-Exception) may not transmit the SRS, the PUCCH, the PUSCH, or the PRACH that are configured through the upper signal for the UE to transmit.

Embodiment 2

In Embodiment 2, it is assumed that the additional field for notifying information about a COT does not exist in the SFI field of the DCI format. The COT refers to a period of time in which the BS that attempts to perform communication with the UE by using an unlicensed band performs a channel access procedure to occupy the unlicensed band and then performs communication. The COT may be represented with an absolute time or symbol unit. When there is no information for separately indicating the COT, the UE may implicitly determine the COT of the BS by using a method below.

For example, the UE may determine that a slot indicated by an SFI of the DCI format is a slot that corresponds to the COT of the BS or is included within the COT of the BS. Based on the determined COT information, the UE may differently determine a channel access procedure type to be performed for transmission of UL indicated through UL/L scheduling information or UL transmission configured through the upper signal, depending on whether or not the UL transmission is performed within the COT of the BS, or may change the channel access procedure type.

The UE may be indicated, through the UL/DL scheduling information, to use the channel access procedure type 3 for the UL transmission. When the UL transmission can be performed within the COT of the BS, the UE may perform the channel access procedure type 1 or the channel access procedure type 2, and according to a result thereof, the UE may or may not perform the UL transmission. When the UL transmission is initiated in 16 μs or 16 μs+TA time immediately after a symbol in which DL transmission by the BS is ended, the UE may perform the channel access procedure type 1. When the UL transmission is initiated after 16 μs or 16 μs+TA time immediately after a symbol in which DL transmission by the BS is ended, the UE may perform the channel access procedure type 2. That is, for the UL transmission performed in the COT of the BS, the UE may switch to the channel access procedure type 2 as an indicated or configured channel access procedure and perform the channel access procedure, and may or may not perform the UL transmission, in response to a result of the channel access procedure.

Referring again to FIG. 10, when the BS attempts to perform communication with the UE by occupying a period of time after the channel access procedure is completed, e.g., an unlicensed band from a time or symbol 1050 to a time or symbol 1060, a COT of the BS corresponds to 42 symbols 1070. The BS may transmit, through a DCI format, SFI information about one or more slots in a DL control channel transmission region or CORESET 1021, such that the UE having received the information may determine the COT of the BS. The BS may transmit, through the DCI format, an SFI X1 1011 for at least a slot n+1 1001 in the DL control channel region 1021 of the slot n+1 1001. The BS may transmit, through the DCI, the SFI X1 1011 for at least the slot n+1 1001 and the SFI X2 1012 for the slot n+2 1002. Upon receipt of the information, the UE may determine the COT of the BS to be the slot n+1 or a duration between the slot n+1 and the slot n+2, which are indicated by the SFI, or may determine that the slot n+1 or the slot n+1 and the slot n+2, which are indicated by the SFI, are slots included in the COT of the BS.

The COT of the BS may be initiated or ended in any symbol of a slot. However, because an SFI can indicate a slot format for a slot or 14 symbols, a case where the SFI indicates a time other than the COT of the BS may occur. For example, the COT of the BS when the BS transmits an SFI X3 1013 for a slot n+3 1003 to the UE corresponds to when the COT is ended within the slot n+3 1003. When the SFI X3 1013 for the slot n+3 1003 is indicated, the UE may determine that a slot indicated by an SFI corresponds to the COT of the BS, such that, in Embodiment 2, it is recommended that the BS does not provide the SFI X3 1013 for the slot n+3 1003 to the UE.

For the symbol or slot n+3 1003 that is not included in the COT, the UE may determine that SFI information is not provided or indicated, or may determine that it failed to detect the DCI, and may operate as below with respect to the symbols.

The UE may perform a channel access procedure according to a channel access procedure type indicated or configured by the BS, and according to a result thereof, the UE may or may not perform UL transmission.

The UE may receive a DL data channel or a CSI-RS indicated through another DCI (e.g., UUDL scheduling DCI).

The UE may transmit a UL data channel, a UL control channel, a PRACH, or an SRS, which is indicated by another DCI (e.g., ULDL scheduling DCI or DCI indicating transmission of the SRS).

The UE may receive and detect a PDCCH through a configured CORESET and control space in the symbols.

The UE may not receive a PDSCH or a CSI-RS which is configured, through an upper signal, for the UE to receive.

When the UE determines that the SFI information is not provided or indicated through an upper signal (e.g., Cat4LBT-Exception), or is configured to transmit an SRS, a PUCCH, a PUSCH, or a PRACH that are configured, through an upper signal, for the UE to transmit in symbols for which DCI that transmits SFI information is not received, the UE may transmit, in the symbols 1085, the SRS, the PUCCH, the PUSCH, or the PRACH that are configured, through the upper signal, for the UE to transmit. The UE that is not provided the upper signal (e.g., Cat4LBT-Exception) may not transmit the SRS, the PUCCH, the PUSCH, or the PRACH that are configured, through the upper signal, for the UE to transmit.

Embodiment 3

In Embodiment 3, it is assumed that an additional field for notifying information about a COT exists in an SFI field of the DCI format. Further, it is assumed that DCI includes SFIs for a plurality of cells. For convenience of the description, in Embodiment 3, a cell that transmits the DCI is referred to as Cell 1, and a cell that determines SFI information based on the DCI transmitted from Cell 1 is referred to as Cell 2. Accordingly, the DCI includes an SFI field for Cell 1 and an SFI field for Cell 2. The UE may be configured with which SFI for a cell corresponds to which position, order, or field in the DCI, through an upper signal, by a base station or a core network. The UE may be configured with which COT field for a cell corresponds to which position, order, or field in the DCI, through the upper signal, by a base station or a core network.

In Both Cell 1 and Cell 2 may perform communication between the BS and the UE in a licensed band. Further, Cell 1 may perform communication between the BS and the UE in a licensed band and Cell 2 may perform communication between the BS and the UE in an unlicensed band, or Cell 1 may perform communication between the BS and the UE in an unlicensed band and Cell 2 may perform communication between the BS and the UE in an licensed band. Both Cell 1 and Cell 2 may perform communication between the BS and the UE in an unlicensed band.

For convenience of the description, in Embodiment 3, it is assumed that Cell 1 performs communication between the BS and the UE in a licensed band and Cell 2 performs communication between the BS and the UE in an unlicensed band. It is assumed that an SFI field includes an additional field for notifying information about a COT with respect to a cell that performs communication between the BS and the UE in an unlicensed band, but it is also possible that an SFI field includes an additional field for notifying information about a COT with respect to a cell that performs communication between the BS and the UE in a licensed band.

Figure 11:
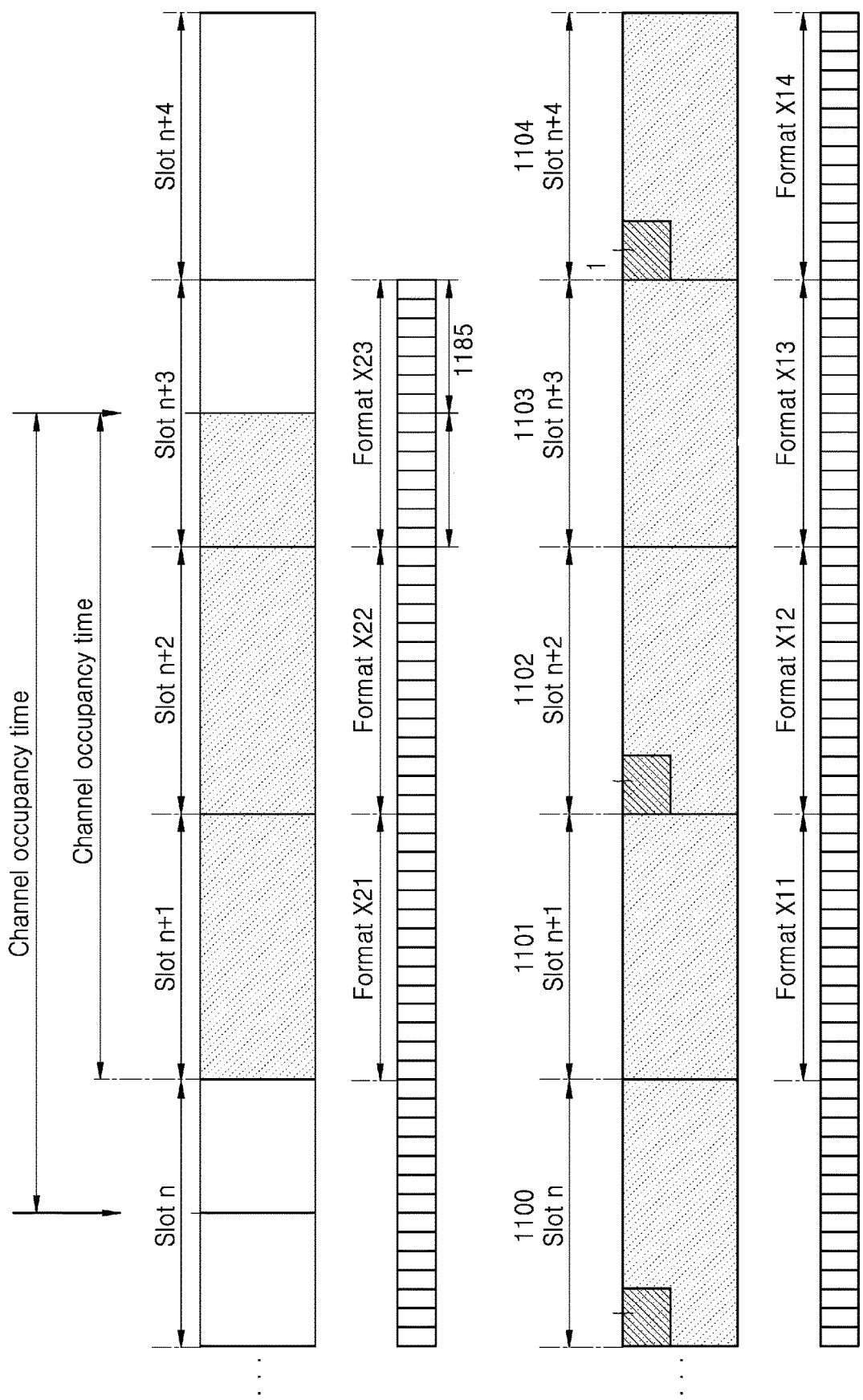
FIG. 11 illustrates a time resource allocation type in a wireless communication system, according to an embodiment.

FIG. 11 illustrates a time resource allocation type in a wireless communication system, according to an embodiment.

Referring to FIG. 11, until Cell 1 initiates transmission of the DCI or configures and generates information to be included in the DCI, the BS is not able to determine whether it is possible to perform a channel access procedure on Cell 2 or is performing a channel access procedure on Cell 2. As another example, the BS may be performing or may fail to perform configuration of SFI information about at least one slot among slots of Cell 2.

When Cell 1 transmits DCI, the DCI should include SFI information and COT information related to Cell 2, but it may not be possible to determine at least one of the SFI information or the COT information related to Cell 2. In particular, in an unlicensed band, the UE determines a channel access procedure type to be performed for UL transmission, or determines whether to perform UL/DL transmission or reception, based on SFI information and COT information related to Cell 2. Therefore, the SFI information and the COT information related to Cell 2 have to be correctly transmitted.

When the DCI is transmitted in a time, symbol, or slot in which the BS has not completed a channel access procedure on Cell 2, the UE that has received the SFI information and the COT information related to Cell 2 should determine that the BS fails to complete the channel access procedure on Cell 2, determine that the BS fails to occupy a channel in Cell 2, determine that the SFI information is not provided, or determine that the COT information is not provided, based on the SFI information and the COT information related to Cell 2.

When the BS transmits SFI information and COT information related to a cell (e.g., Cell 2) for which at least one of SFI configuration or COT information cannot be determined, the BS may configure or indicate a COT for the cell as 0, may configure or indicate a value that is predefined between the BS and the UE, or may configure or indicate a particular value configured to the UE through an upper signal, such that the UE may discard at least the SFI configuration and the COT information from among transmitted information related to the cell or may determine that the SFI configuration and the COT information are not provided.

The predefined value or the value configured through the upper signal may be one of a real value and a positive number or one of a negative value and a non-numerical value. With respect to the cell for which the SFI information and the COT information are received through the DCI, when the received COT corresponds to 0, is the value predefined with the BS, is the particular value configured to the UE through the upper signal, is a negative value, or is a non-numerical value that is predefined or configured through an upper signal, the UE may discard at least the SFI configuration and the COT information in the transmitted information related to the cell, may determine that the DCI is not detected, or may determine that the SFI configuration and the COT information are not provided.

When the BS transmits the SFI information and the COT information related to the cell (e.g., Cell 2) for which at least one of the SFI configuration or the COT information cannot be determined, the BS may perform one of followings with respect to an SFI for the cell:

configure or indicate the SFI as a slot format by which all symbols are indicated as flexible symbols, configure or indicate the SFI as a particular slot format such as a slot format of 255 or a value corresponding thereto, configure or indicate the SFI as a reserved value or a slot format corresponding thereto, configure or indicate the SFI as a predefined value or a slot format configured through an upper signal (e.g., an empty slot format not including slot format information or a value corresponding thereto, or indication using one or more values among slot format values reserved as non-numerical values), or indicate a slot format corresponding to an error to allow the UE to discard at least SFI information, to determine that the SFI is not provided, or to determine that DCI is not received with respect to a slot indicated as the value in the transmitted information related to the cell.

Further, the UE may perform the determination based on a combination of two or more indicating methods described above. When the BS indicates a slot format corresponding to an error, e.g., when the BS indicates a slot format of a smaller number of slots than a number of slots configuring a DCI interval, the BS may indicate a slot format for a slot to be indicated, by using a reserved value.

When the slot format of 255 is indicated, e.g., when the UE is not provided SFI information, e.g., tdd-UL-DL-ConfigurationCommon, tdd-UL-DL-ConfigurationCommon2, or tdd-UL-DL-ConfigDedicated, which is configured through an upper signal, the BS may use the slot format of 255 to allow the UE to determine that the slot format is not valid information. Even when the UE is not provided SFI information, which is configured through an upper signal, the BS may use the slot format of 255 to allow the UE to determine that the slot format is not valid information.

When the BS indicates a slot format corresponding to an error, the BS may indicate at least one symbol from among symbols to be DL/UL symbol through the DCI, the symbols being indicated as ULDL symbols through the SFI information, e which is configured through the upper signal, or may indicate, for a particular slot, a slot format different from the slot format that is already indicated through the DCI.

The BS may indicate a slot format only for a slot corresponding to an interval shorter than an interval in which DCI to transmit a slot format is transmitted. When a value from among reserved slot format values (e.g., R) is used, the value or slot format may be predefined between the BS and the UE or may be configured through an upper signal. For example, one slot format among 62-254 of Table 3 or one of R values corresponding thereto may be configured to the UE through an upper signal.

An operation of the UE may be further indicated by using a plurality of reserved values. For example, a first reserved value R1 may be used to indicate, to the UE, that UL transmission configured through an upper signal is possible in a slot for which the first reserved value R1 is indicated. A second reserved value R2 may be used to indicate, to the UE, that UL transmission configured through an upper signal is not possible in a slot for which the second reserved value R2 is indicated.

As another example, a first (or third) reserved value R1 may be used to indicate, to the UE, that Cell 2 is performing a channel access procedure in a slot for which the first (or third) reserved value R1 is indicated. A second (or fourth) reserved value R2 may be used to indicate, to the UE, that Cell 2 has occupied a channel but is not able to determine an SFI for a slot for which the second (or fourth) reserved value R2 is indicated. In this regard, it is possible to define a slot format corresponding to the reserved value. A reserved value R may be configured as an empty slot format not including slot format information, may be configured as a particular slot format pattern value (e.g., DUDUDUDU . . . ), or may be configured as a particular value other than a slot format expressed with D/U/F or a non-numerical value.

With respect to a cell from which SFI information is received through DCI, when the received SFI value is:
- a slot format by which all symbols are indicated as flexible symbols,
- a slot format value of 255 or a particular slot format (e.g., a slot format configured as an empty slot format not including slot format information, a particular slot format pattern value (e.g., DUDUDUDU . . . ), or a slot format expressed with D/U/F) or a value corresponding thereto,
- a reserved value or a slot format corresponding thereto,
- a predefined value, a value configured through an upper signal, or a slot format corresponding thereto,
- when a slot format corresponds to an error, the UE may discard at least indicated SFI information from among transmitted information related to the cell, may determine that it fails to determine DCI, or may determine that the SFI information is not provided. The UE may discard the SFI information and the COT information or may determine that the COT information is not provided. In this case, the UE may perform a channel access procedure according to a channel access procedure type indicated or configured by the BS, and according to a result thereof, the UE may or may not perform UL transmission.

As described above, the UE may discard the provided SFI information, may determine that the SFI information is not provided nor indicated, or may determine that it fails to determine the DCI, and may operate as below with respect to symbols or slot, and symbols or slot outside the COT.

- The UE may receive a DL data channel or a CSI-RS indicated through another DCI (e.g., UL/DL scheduling DCI).
- The UE may transmit a UL data channel, a UL control channel, a PRACH, or an SRS, which is indicated by another DCI (e.g., UL/DL scheduling DCI or DCI indicating transmission of the SRS).
- The UE may receive and detect a PDCCH through a configured CORESET and control space in the symbols.
- The UE may not receive a PDSCH or a CSI-RS which is configured, through an upper signal, for the UE to receive.
- When the UE determines that the SFI information is not provided or indicated through an upper signal (e.g., Cat4LBT-Exception), or is configured to transmit an SRS, a PUCCH, a PUSCH, or a PRACH that are configured, through an upper signal, for the UE to transmit in symbols for which DCI that transmits SFI information is not received, the UE may transmit, in the symbols 1185, the SRS, the PUCCH, the PUSCH, or the PRACH which are configured, through the upper signal, for the UE to transmit. The UE that is not provided the upper signal (e.g., Cat4LBT-Exception) may not transmit the SRS, the PUCCH, the PUSCH, or the PRACH that are configured, through the upper signal, for the UE to transmit.

Embodiment 4

In Embodiment 4, it is assumed that an additional field for notifying information about a COT does not exist in an SFI field of the DCI format. Further, it is assumed that DCI includes SFIs for a plurality of cells. For convenience of the description, in Embodiment 4, Cell 1 transmits the DCI, and Cell 2 determines SFI information based on the DCI transmitted from Cell 1. Accordingly, the DCI includes an SFI field for Cell 1 and an SFI field for Cell 2. The UE may be configured with which SFI for a cell corresponds to which position, order, or field in the DCI, through an upper signal by a base station or a core network.

Both Cell 1 and Cell 2 may perform communication between the BS and the UE in a licensed band. Further, Cell 1 may perform communication between the BS and the UE in a licensed band and Cell 2 may perform communication between the BS and the UE in an unlicensed band, or Cell 1 may perform communication between the BS and the UE in an unlicensed band and Cell 2 may perform communication between the BS and the UE in an licensed band. In this regard, both Cell 1 and Cell 2 may perform communication between the BS and the UE in an unlicensed band.

For convenience of the description, in Embodiment 4, it is assumed that Cell 1 performs communication between the BS and the UE in a licensed band and Cell 2 performs communication between the BS and the UE in an unlicensed band.

Referring again to FIG. 11, until Cell 1 initiates transmission of the DCI or configures and generates information to be included in the DCI, the BS is not able to determine whether it is possible to perform a channel access procedure on Cell 2 or is performing a channel access procedure on Cell 2. As another example, the BS may be performing or may fail to perform configuration of SFI information about at least one slot among slots of Cell 2.

When Cell 1 transmits DCI, the DCI should include SFI information related to Cell 2, but it may not be possible to determine the SFI information related to Cell 2. In particular, in an unlicensed band, the UE determines a COT of the BS through SFI information related to Cell 2, and thus determines a channel access procedure type to be performed for UL transmission or determines whether to perform ULDL transmission or reception. Accordingly, the SFI information related to Cell 2 should be correctly transmitted.

When DCI is transmitted in a time, symbol, or slot in which the BS has not completed a channel access procedure on Cell 2, and the UE receives the SFI information related to Cell 2, the UE may determine, as the COT of the BS, a slot for which a slot format is indicated. Accordingly, the UE should determine, based on the SFI indicated for Cell 2, that the BS has not yet completed the channel access procedure on Cell 2, that the BS fails to occupy a channel in Cell 2, that the SFI information is not provided, or that the COT information is not provided.

When the BS transmits the SFI for the cell (e.g., Cell 2) for which at least one of the SFI configuration or the COT information cannot be determined, the BS may perform one of followings with respect to an SFI for the cell:
- configure or indicate the SFI as a slot format by which all symbols are indicated as flexible symbols,
- configure or indicate the SFI as a particular slot format such as a slot format of 255 or a value corresponding thereto,
- configure or indicate the SFI as a reserved value or a slot format corresponding thereto,
- configure or indicate the SFI as a predefined value or a slot format configured through an upper signal (e.g., an empty slot format not including slot format information or a value corresponding thereto, or indication using one or more values among slot format values reserved as non-numerical values), or
- indicate a slot format corresponding to an error to allow the UE to discard at least SFI information, to determine that the SFI is not provided, or to determine that DCI is not received with respect to a slot indicated as the value in the transmitted information related to the cell.

Further, the UE may perform the determination based on a combination of two or more indicating methods described above. When the BS indicates a slot format corresponding to an error, e.g., when the BS indicates a slot format of a smaller number of slots than a number of slots configuring a DCI interval, the BS may indicate a slot format for a slot to be indicated, by using a reserved value.

When the slot format of 255 is indicated, e.g., when the UE is not provided SFI information, e.g., tdd-UL-DL-ConfigurationCommon, tdd-UL-DL-ConfigurationCommon2, or tdd-UL-DL-ConfigDedicated, which is configured through an upper signal, the BS may use the slot format of 255 to allow the UE to determine that the slot format is not valid information. Even when the UE is not provided SFI information, which is configured through an upper signal, the BS may use the slot format of 255 to allow the UE to determine that the slot format is not valid information. When the BS indicates a slot format corresponding to an error, the BS may indicate at least one symbol from among symbols to be DL/UL symbol through the DCI, the symbols being indicated as ULDL symbols through the SFI information, which is configured through the upper signal, or may indicate, for a particular slot, a slot format different from the slot format that is already indicated through the DCI.

The BS may indicate a slot format only for a slot corresponding to an interval shorter than an interval in which DCI to transmit a slot format is transmitted. When a value from among reserved slot format values (e.g., R) is used, the value or slot format may be predefined between the BS and the UE or may be configured through an upper signal. For example, one slot format among 62-254 of Table 3 or one of R values corresponding thereto may be configured to the UE through an upper signal.

An operation of the UE may be further indicated by using a plurality of reserved values. For example, a first reserved value R1 may be used to indicate, to the UE, that UL transmission configured through an upper signal is possible in a slot for which the first reserved value R1 is indicated. A second reserved value R2 may be used to indicate, to the UE, that UL transmission configured through an upper signal is not possible in a slot for which the second reserved value R2 is indicated.

As another example, a first (or third) reserved value R1 may be used to indicate, to the UE, that Cell 2 is performing a channel access procedure in a slot for which the first (or third) reserved value R1 is indicated. A second (or fourth) reserved value R2 may be used to indicate, to the UE, that Cell 2 has occupied a channel but is not able to determine an SFI for a slot for which the second (or fourth) reserved value R2 is indicated. In this regard, it is possible to define a slot format corresponding to the reserved value. A reserved value R may be configured as an empty slot format not including slot format information, may be configured as a particular slot format pattern value (e.g., DUDUDUDU . . . ), or may be configured as a particular value other than a slot format expressed with D/U/F or a non-numerical value.

With respect to a cell from which SFI information is received through DCI, when the received SFI value is:
- a slot format by which all symbols are indicated as flexible symbols,
- a slot format value of 255 or a particular slot format (e.g., a slot format configured as an empty slot format not including slot format information, a particular slot format pattern value (e.g., DUDUDUDU . . . ), or a slot format expressed with D/U/F) or a value corresponding thereto,
- a reserved value or a slot format corresponding thereto,
- a predefined value, a value configured through an upper signal, or a slot format corresponding thereto, or
- when a slot format corresponds to an error, the UE may discard at least indicated SFI information from among transmitted information related to the cell, may determine that it fails to determine DCI, or may determine that the SFI information is not provided. In this regard, the UE may discard not only the SFI information but also discard COT information or may determine that the COT information is not provided.

The UE may perform a channel access procedure according to a channel access procedure type indicated or configured by the BS, and according to a result thereof, the UE may or may not perform UL transmission. As described above, the UE may discard the provided SFI information, may determine that the SFI information is not provided nor indicated, or may determine that it fails to determine the DCI, and may operate as below with respect to symbols or slot, and symbols or slot outside the COT.

The UE may receive a DL data channel or a CSI-RS indicated through another DCI (e.g., ULDL scheduling DCI).

The UE may transmit a UL data channel, a UL control channel, a PRACH, or an SRS, which is indicated by another DCI (e.g., ULDL scheduling DCI or DCI indicating transmission of the SRS).

The UE may receive and detect a PDCCH through a configured CORESET and control space in the symbols.

The UE may not receive a PDSCH or a CSI-RS which is configured, through an upper signal, for the UE to receive.

When the UE determines that the SFI information is not provided or indicated through an upper signal (e.g., Cat4LBT-Exception), or is configured to be enabled to transmit an SRS, a PUCCH, a PUSCH, or a PRACH that are configured, through an upper signal, for the UE to transmit in symbols for which DCI that transmits SFI information is not received, the UE may transmit, in the symbols 1185, the SRS, the PUCCH, the PUSCH, or the PRACH that are configured, through the upper signal, for the UE to transmit. The UE that is not provided the upper signal may not transmit the SRS, the PUCCH, the PUSCH, or the PRACH that are configured, through the upper signal, for the UE to transmit.

Figure 12:
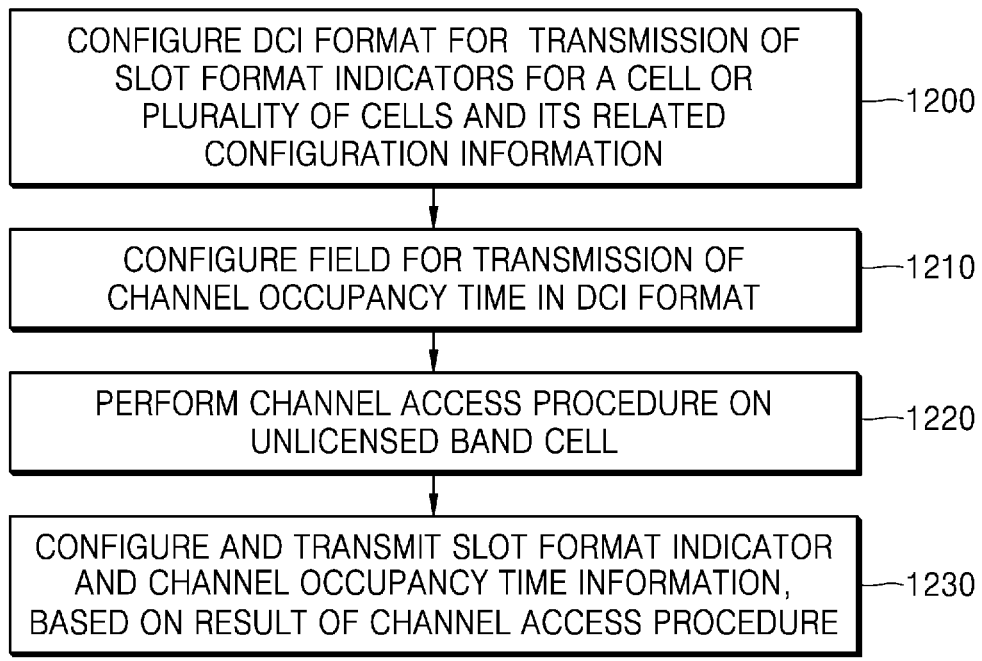
FIG. 12 is a flowchart illustrating a BS method for determining a time resource allocation region in a wireless communication system, according to an embodiment.

FIG. 12 is a flowchart illustrating a BS method for configuring or indicating an SFI and/or COT information of the BS in a wireless communication system, according to an embodiment.

Referring to FIG. 12, in step 1200 or prior to step 1200, the BS may determine, based on capability information of a UE, one or more UL channel access procedure types for the UE to use in an unlicensed band, one or more start positions for transmission of a UL signal or channel, the number of PDSCHs/PUSCHs or slots which can be configured through one DCI, a gap guard, etc., may determine configuration information for the UE to use in transmission of the UL signal or channel through the unlicensed band, in consideration of at least one of the plurality of pieces of information, and may configure, provide, or transmit the configuration information to the UE. When the BS transmits information about a cell to transmit an SFI, an SFI transmission period, a time/frequency control channel domain in which a DCI format including the SFI is transmitted, and SFIs for a plurality of cells through DCI, the BS may perform configuration about positions or bit regions in which the SFIs for the respective cells are to be transmitted in the DCI, and may transmit configured values to the UE through an upper signal. That is, the BS may transmit the configuration information for communication with the UE.

In step 1210, when a cell or at least one cell from among a plurality of cells for which SFIs are transmitted through the DCI is an unlicensed band cell, the BS may configure a COT field and information related thereto to transmit, to the UE, a period of time in which the BS occupies a channel in the unlicensed band, e.g., may configure an allowable COT set configured to indicate a COT to the UE, and may transmit the configured information to the UE.

In step 1220, the BS performs a channel access procedure on the unlicensed band cell from among the cells.

In step 1230, the BS configures a result of the channel access procedure and an SFI and/or COT information related to the corresponding cell according to various embodiments of the disclosure before the BS transmits the DCI, and transmits the configuration to the UE through the DCI.

Figure 13:
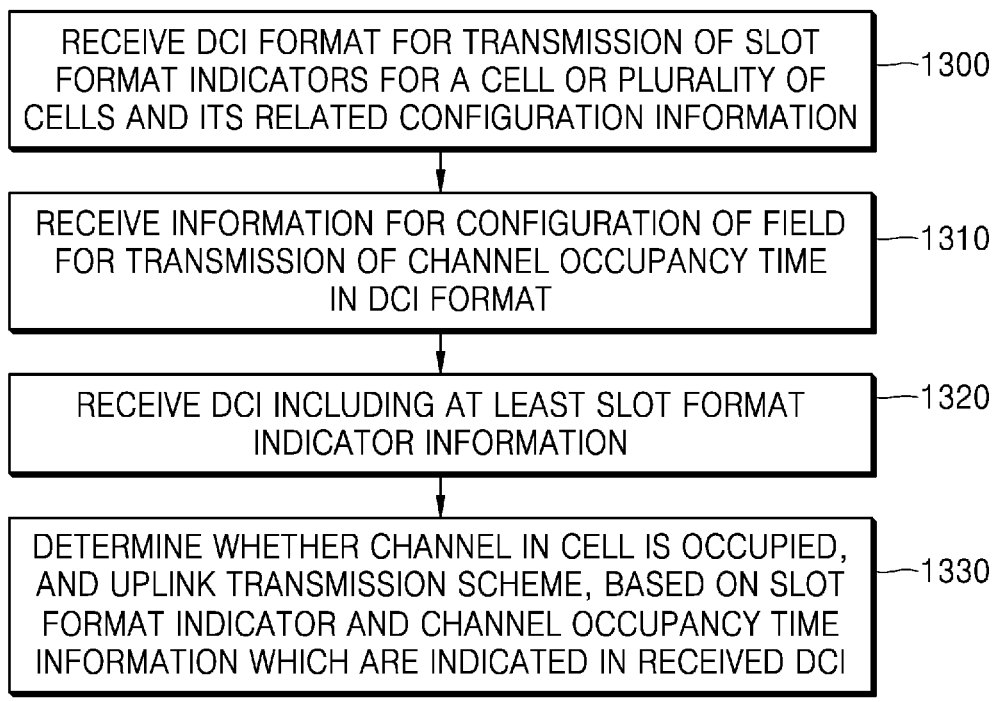
FIG. 13 is a flowchart illustrating a UE method for determining a time resource allocation region in a wireless communication system, according to an embodiment.

FIG. 13 is a flowchart illustrating a UE method for determining a time resource allocation region in a wireless communication system, according to an embodiment. Specifically, FIG. 13 is a flowchart illustrating a UE method for determining whether a BS occupies a channel and/or whether the UE is to transmit a UL signal, and determining at least one of channel access procedure types to be performed, based on an SFI and/or COT information received by the UE in a wireless communication system.

Referring to FIG. 13, in step 1300 or prior thereto, the UE may transmit, to a BS, capability information including one or more UL channel access procedure types for the UE to use in an unlicensed band, one or more start positions for transmission of a UL signal or channel, the number of PDSCHs/PUSCHs or slots which can be configured through one DCI, a gap guard, etc. In this regard, without transmission of the capability information including the information, one or more UL channel access procedure types for the UE to use in an unlicensed band, one or more start positions for transmission of a UL signal or channel, the number of PDSCHs/PUSCHs or slots that can be configured through one DCI, a gap guard, etc., may be predefined. One or more UL channel access procedure types, one or more start positions for transmission of a UL signal or channel, the number of PDSCHs/PUSCHs or slots which can be configured through one DCI, a gap guard, etc., may be independent according to unlicensed band frequencies or rules of respective nations or areas. Further, when the BS transmits information about a cell to transmit an SFI, an SFI transmission period, a time/frequency control channel domain in which a DCI format including the SFI is transmitted, and SFIs for a plurality of cells through DCI, the UE receives, through an upper signal, configuration information about positions or bit regions in which the SFIs for the respective cells are to be transmitted in the DCI, and may perform configuration, based on the configuration information. That is, the UE receives the configuration information for communication with the BS.

In step 1310, the UE receives configuration information for additionally including COT information in the DCI, from the BS.

In step 1320, the UE receives the DCI including at least SFI information from the BS, and in step 1330, the UE determines whether the BS occupies a channel in an unlicensed band cell and/or whether the UE is to transmit a UL signal, and determines at least one of channel access procedure types to be performed, by using at least one of the SFI information and/or the COT information which are received through the DCI.

In the disclosure, the expressions such as "greater (larger) than or equal to" or "smaller (less) than or equal to" are used to determine whether a particular condition (or criterion) is fulfilled, but the expressions may not exclude meaning of "exceeding" or "smaller (less) than". A condition written with "greater (larger) than or equal to" may be replaced with "exceeding", a condition with "smaller (less) than or equal to" may be replaced with "smaller (less) than", and a condition with "greater (larger) than or equal to . . . and smaller (less) than . . . " may be replaced with "exceeding . . . and smaller (less) than or equal to . . . ".

The methods according to the embodiments described above may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, each memory may refer to a plurality of memories.

The programs may also be stored in an attachable storage device that is accessible through a communication network such as the Internet, an intranet, a local area network (LAN), a WLAN, a storage area network (SAN), or a combination thereof. The storage device may be connected through an external port to an apparatus according to the embodiments of the disclosure. Another storage device on the communication network may also be connected to the apparatus performing the embodiments of the disclosure.

According to the above-described embodiments, a service may be effectively provided in a wireless communication system.

Elements included in the disclosure may be expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

The above-described embodiments of the disclosure are merely illustrative of specific examples to easily facilitate description and understanding of the disclosure, and are not intended to limit the scope of the disclosure. One of ordinary skill in the art will appreciate that other modifications based on the technical ideas of the disclosure are feasible. Also, Embodiment 1 to Embodiment 4 of the disclosure may be combined with each other. For example, portions of the methods provided by the disclosure may be combined with each other.

While the disclosure has been described in terms of certain embodiments, those skilled in the art will recognize that the embodiments described herein can be practiced with modification within the spirit and scope of the present disclosure, which is defined, not by the detailed description and embodiments described herein, but by the appended claims and their equivalents.

What is claimed is:

1. A method, performed by a user equipment (UE), the method comprising:
   receiving, from a base station (BS), configuration information including a plurality of reserved values regarding at least one slot format indicator (SFI);
   receiving, on a first cell, downlink control information (DCI) including an SFI field and a channel occupancy time (COT) field for a second cell;
   in case that a value of the SFI field corresponds to one of the plurality of reserved values included in the configuration information,
   identifying at least one symbol outside a COT, among a plurality of symbols, based on the COT field; and
   in case that a higher layer parameter indicating to perform sounding reference signal (SRS) transmission on the at least one symbol outside the COT is configured, transmitting an SRS on the at least one symbol outside the COT.

2. The method of claim 1, further comprising:
   in case that a higher layer parameter indicating to perform a channel access procedure on the at least one symbol outside the COT is configured performing the channel access procedure on the at least one symbol outside the COT.

3. The method of claim 1, further comprising:
   receiving a downlink data channel or a channel state information reference signal (CSI-RS), on the at least one symbol side the COT, based on other DCI different from the received DCI.

4. The method of claim 1, wherein the SFI field indicates a slot format in a unit of a slot, and
   wherein the COT field indicates the COT in a unit of a symbol.

5. The method of claim 1, wherein the SFI field further includes information indicating that a slot or the at least one symbol outside the COT is a flexible slot or a flexible symbol.

6. A method, performed by a base station (BS), the method comprising:
   transmitting, to a user equipment (UE), configuration information including a plurality of reserved values regarding at least one slot format indicator (SFI); and
   transmitting, on a first cell, downlink control information (DCI) including an SFI field and a channel occupancy time (COT) field for a second cell, to the UE,
   wherein, in case that a value of the SFI field corresponds to one of the plurality of reserved values included in the configuration information, at least one symbol outside a COT, among a plurality of symbols, is identified at the UE based on the COT field, and
   wherein, in case that a higher layer parameter indicating to perform sounding reference signal (SRS) transmission on the at least one symbol outside the COT is configured, an SRS is transmitted on the at least one symbol outside the COT.

7. The method of claim 6, wherein the SFI field indicates a slot format in a unit of a slot, and
   wherein the COT field indicates the COT in a unit of a symbol.

8. A user equipment (UE) comprising:
   a transceiver; and
   a processor coupled with the transceiver and configured to:
   receive, from a base station (BS), configuration information including a plurality of reserved values regarding at least one slot format indicator (SFI),
   receive, on a first cell, downlink control information (DCI) including thean SFI field and a channel occupancy time (COT) field for a second cell,
   in case that a value of the SFI field corresponds to one of the plurality of reserved values included in the configuration information,
   identify at least one symbol outside a COT, among a plurality of symbols, based on the COT field, and
   in case that a higher layer parameter indicating to perform sounding reference signal (SRS) transmission on the at least one symbol outside the COT is configured, transmit an SRS on the at least one symbol outside the COT.

9. The UE of claim 8, wherein the processor is further configured to:

in case that a higher layer parameter indicating to perform a channel access procedure on the at least one symbol outside the COT is configured, perform the channel access procedure on the at least one symbol outside the COT.

10. The UE of claim 8, wherein the processor is further configured to receive a downlink data channel or a channel state information reference signal (CSI-RS) on the at least one symbol outside the COT, based on other DCI different from the received DCI.

11. The UE of claim 8, wherein the SFI field indicates a slot format in a unit of a slot, and wherein the COT field indicates the COT in a unit of a symbol.

12. The UE of claim 8, wherein the SFI field further includes information indicating that a slot or the at least one symbol outside the COT is a flexible slot or a flexible symbol.

13. A base station (BS), comprising:
a transceiver; and
a processor configured to:
transmit, to a user equipment (UE), configuration information including a plurality of values regarding at least one slot format indicator (SFI), and
transmit, on a first cell, downlink control information (DCI) including an SFI field and a channel occupancy time (COT) field for a second cell, to the UE,
wherein, in case that a value of the SFI field corresponds to one of the plurality of reserved values included in the configuration information, at least one symbol outside a COT, among a plurality of symbols, is identified at the UE based on the COT field, and
wherein, in case that a higher layer parameter indicating to perform sounding reference signal (SRS) transmission on the at least one symbol outside the COT is configured, an SRS is transmitted on the at least one symbol outside the COT.

14. The BS of claim 13, wherein the SFI field indicates a slot format in a unit of a slot, and wherein the COT field indicates the COT in a unit of a symbol.

\* \* \* \* \*